(12) United States Patent
Fujioka et al.

(10) Patent No.: US 9,052,580 B2
(45) Date of Patent: Jun. 9, 2015

(54) OUTER HOUSING FOR AN IMAGE PROJECTION APPARATUS

(71) Applicants: Tetsuya Fujioka, Kanagawa (JP); Yasutada Tsukioka, Kanagawa (JP); Naoyuki Ishikawa, Kanagawa (JP); Hideo Kanai, Tokyo (JP); Masamichi Yamada, Kanagawa (JP)

(72) Inventors: Tetsuya Fujioka, Kanagawa (JP); Yasutada Tsukioka, Kanagawa (JP); Naoyuki Ishikawa, Kanagawa (JP); Hideo Kanai, Tokyo (JP); Masamichi Yamada, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 93 days.

(21) Appl. No.: 13/666,124

(22) Filed: Nov. 1, 2012

(65) Prior Publication Data

US 2013/0114052 A1    May 9, 2013

(30) Foreign Application Priority Data

Nov. 4, 2011    (JP) .................................. 2011-242926

(51) Int. Cl.
*G03B 21/14* (2006.01)
*G03B 21/16* (2006.01)
*G03B 21/28* (2006.01)
(Continued)

(52) U.S. Cl.
CPC ............. *G03B 21/145* (2013.01); *H04N 9/3144* (2013.01); *H04N 5/64* (2013.01); *H04N 9/3141* (2013.01); *G03B 21/28* (2013.01); *G03B 21/16* (2013.01)

(58) Field of Classification Search
CPC ...... G03B 21/00; G03B 21/14; G03B 21/145; G03B 21/16; G03B 21/28; H04N 5/64; H04N 5/645; H04N 5/655; H04N 9/31; H04N 9/3141; H04N 9/3144

USPC ........... 353/37, 50–52, 57, 60–61, 73, 77–78, 353/98–99, 119; 348/744, 748, 789, 836; 248/918
See application file for complete search history.

(56) References Cited

U.S. PATENT DOCUMENTS

| | | | |
|---|---|---|---|
| 3,644,030 A * | 2/1972 | Fukushima | ..................... 353/98 |
| 6,508,556 B1 | 1/2003 | Ueda | |
| 6,527,397 B2 * | 3/2003 | Furuichi et al. | ............... 353/119 |

(Continued)

FOREIGN PATENT DOCUMENTS

| | | |
|---|---|---|
| CN | 201222159 Y | 4/2009 |
| JP | 11-041547 | 2/1999 |

(Continued)

OTHER PUBLICATIONS

U.S. Appl. No. 13/611,508, filed Sep. 12, 2012, Fujioka, et al.

(Continued)

*Primary Examiner* — Jori S Reilly-Diakun
(74) *Attorney, Agent, or Firm* — Oblon, McClelland, Maier & Neustadt, L.L.P.

(57) ABSTRACT

An image projection apparatus includes: an image forming unit that forms an image using light from a light source; a projecting optical unit that forms a projected image of the image formed by the image forming unit; and an outer housing that houses the image forming unit and the projecting optical unit. The image forming unit and the projecting optical unit are provided in an order from a setting surface of the outer housing. A width of the outer housing in a direction perpendicular to a projection surface is larger at a position where the projecting optical unit is provided than at a position where the image forming unit is provided.

6 Claims, 31 Drawing Sheets

(51) Int. Cl.
*H04N 9/31* (2006.01)
*H04N 5/64* (2006.01)

(56) References Cited

U.S. PATENT DOCUMENTS

| | | | |
|---|---|---|---|
| 6,779,894 B2* | 8/2004 | Shiraishi et al. | 353/57 |
| 7,360,906 B2* | 4/2008 | Onishi et al. | 353/119 |
| 7,972,015 B2* | 7/2011 | Lee et al. | 353/77 |
| 8,641,207 B2* | 2/2014 | Amano et al. | 353/98 |
| 8,702,247 B2* | 4/2014 | Amano et al. | 353/98 |
| 2004/0156117 A1 | 8/2004 | Takaura et al. | |
| 2005/0248731 A1* | 11/2005 | Jung et al. | 353/79 |
| 2007/0177063 A1 | 8/2007 | Hiramatsu | |
| 2008/0218707 A1* | 9/2008 | Adachi et al. | 353/98 |
| 2009/0141246 A1 | 6/2009 | Lee et al. | |
| 2011/0063586 A1* | 3/2011 | Amano et al. | 353/99 |
| 2011/0210945 A1 | 9/2011 | Fujinawa | |
| 2011/0267589 A1* | 11/2011 | Amano et al. | 353/98 |
| 2013/0070216 A1* | 3/2013 | Fujioka et al. | 353/98 |
| 2013/0114045 A1* | 5/2013 | Fujioka et al. | 353/52 |
| 2013/0114054 A1* | 5/2013 | Ishikawa et al. | 353/119 |
| 2013/0114274 A1* | 5/2013 | Fujioka et al. | 362/382 |
| 2013/0128234 A1* | 5/2013 | Fujioka et al. | 353/52 |
| 2013/0242269 A1* | 9/2013 | Kanai et al. | 353/61 |
| 2013/0242270 A1* | 9/2013 | Tsukioka et al. | 353/61 |

FOREIGN PATENT DOCUMENTS

| | | |
|---|---|---|
| JP | 2001-330889 | 11/2001 |
| JP | 2005-338325 | 12/2005 |
| JP | 3924054 | 3/2007 |
| JP | 2007-183301 | 7/2007 |
| JP | 2011-018061 | 1/2011 |
| JP | 2011-175192 | 9/2011 |

OTHER PUBLICATIONS

U.S. Appl. No. 13/664,728, filed Oct. 31, 2012, Ishikawa, et al.
Chinese Office Action issued Jul. 30, 2014, in China Patent Application No. 201210597070.0 (with English Translation).

* cited by examiner

OUTER HOUSING FOR AN IMAGE PROJECTION APPARATUS

CROSS-REFERENCE TO RELATED APPLICATIONS

The present application claims priority to and incorporates by reference the entire contents of Japanese Patent Application No. 2011-242926 filed in Japan on Nov. 4, 2011.

BACKGROUND OF THE INVENTION

1. Field of the Invention

The present invention relates to an image projection apparatus.

2. Description of the Related Art

Conventionally known is an image projection apparatus including image forming unit having a digital mirror device (DMD) or a liquid crystal element being an image generating element for generating an image based on image data received from a personal computer or the like, and an irradiation unit for irradiating the image generating element with light from a light source. In such an image projection apparatus, a light image is formed in the image forming unit, and the light image formed by the image forming unit is imaged on a projection surface using a projecting optical unit (for example, Japanese Patent Application Laid-open No. 2011-175192). In the image projection apparatus disclosed in Japanese Patent Application Laid-open No. 2011-175192, the projecting optical unit is provided above the image forming unit.

When image projection apparatuses are to be used, the image projection apparatus is carried into a meeting room or the like. When a user carries the image projection apparatus, a hand of the user might slip and the user might drop the image projection apparatus, causing the image projection apparatus to damage. Japanese Patent Application Laid-open No. 2011-018061 discloses an image projection apparatus including a plurality of handles for allowing a user to hold on provided on the top surface of the outer housing, so that convenience in carrying the image projection apparatus is improved.

However, if handles are provided in the manner disclosed in Japanese Patent Application Laid-open No. 2011-018061, the number of parts increases, and the cost of the apparatus increases. Furthermore, because a space for installing the handles needs to be provided, the size of the apparatus increases.

There is a need to provide an image projection apparatus that can prevent a user from dropping the apparatus while carrying the apparatus and that can suppress a cost increase and a size increase in the apparatus.

SUMMARY OF THE INVENTION

It is an object of the present invention to at least partially solve the problems in the conventional technology.

According to an embodiment, provided is an image projection apparatus that includes: an image forming unit that forms an image using light from a light source; a projecting optical unit that forms a projected image of the image formed by the image forming unit; and an outer housing that houses the image forming unit and the projecting optical unit. The image forming unit and the projecting optical unit are provided in the given order from a setting surface of the outer housing. A width of the outer housing in a direction perpendicular to a projection surface is larger at a position where the projecting optical unit is provided than at a position where the image forming unit is provided.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
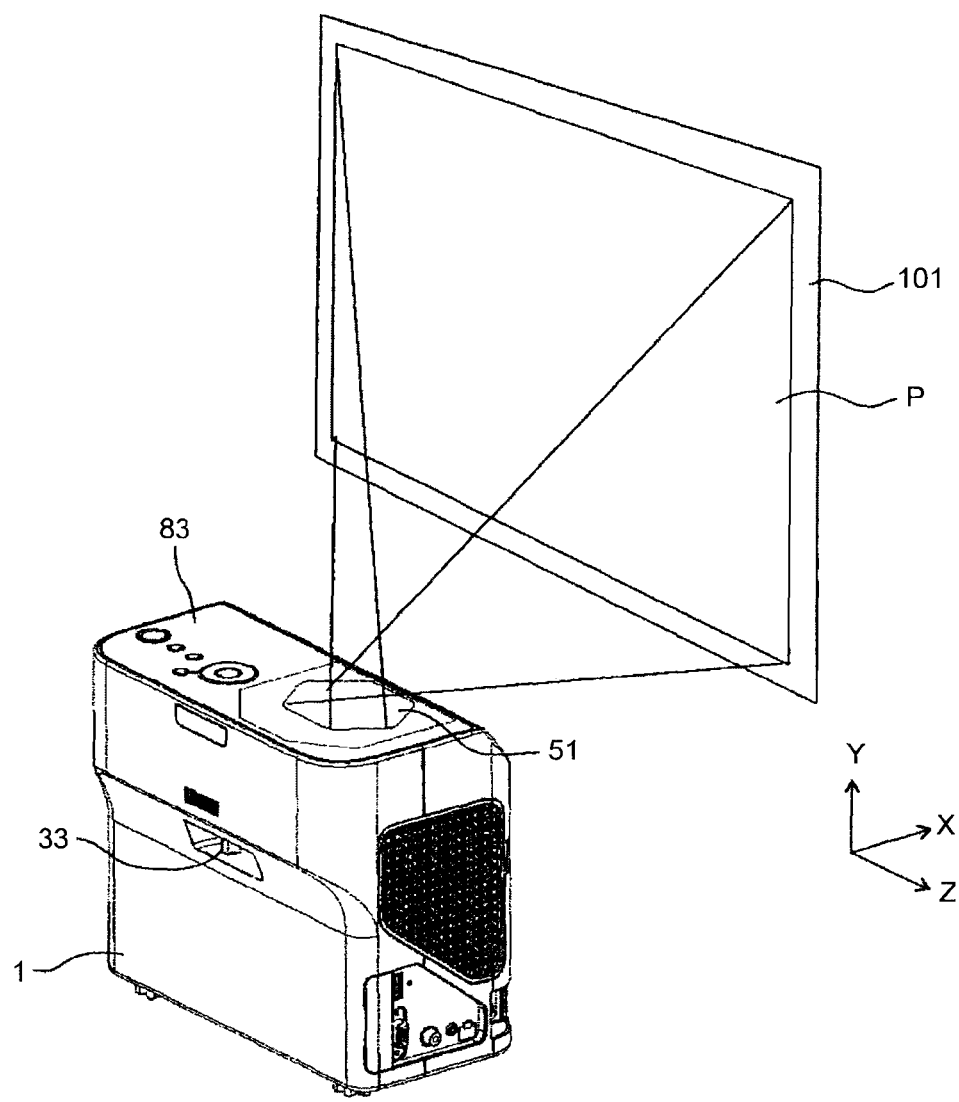
FIG. 1 is a perspective view illustrating a projector according to an embodiment and a projection surface.

An embodiment applied to a projector will now be explained. FIG. 1 is a perspective view illustrating a projector 1 according to the embodiment and a projection surface 101 such as a screen. In the explanations below, the normal direction of the projection surface 101 is referred to as an X direction, and a short side direction (vertical direction) of the projection surface is referred to as a Y direction, and a longitudinal direction (horizontal direction) of the projection surface 101 is referred to as a Z direction.

An embodiment in which an image projection apparatus is applied as a projector will now be explained. FIG. 1 is a perspective view illustrating a projector 1 according to the embodiment and a projection surface 101 such as a screen. In the explanations below, the normal direction of the projection surface 101 is referred to as an X direction, and a short side direction (vertical direction) to the projection surface is referred to as a Y direction, and a longitudinal direction (horizontal direction) of the projection surface 101 is referred to as a Z direction.

As illustrated in FIG. 1, a transmissive glass 51 through which a projected image P is output is provided on the top surface of the projector 1. The projected image P output from the transmissive glass 51 is projected on the projection surface 101 such as a screen.

An operating unit 83 for allowing a user to operate the projector 1 is also provided on the top surface of the projector 1. A focus lever 33 for adjusting the focus is provided on a side surface of the projector 1.

Figure 2:
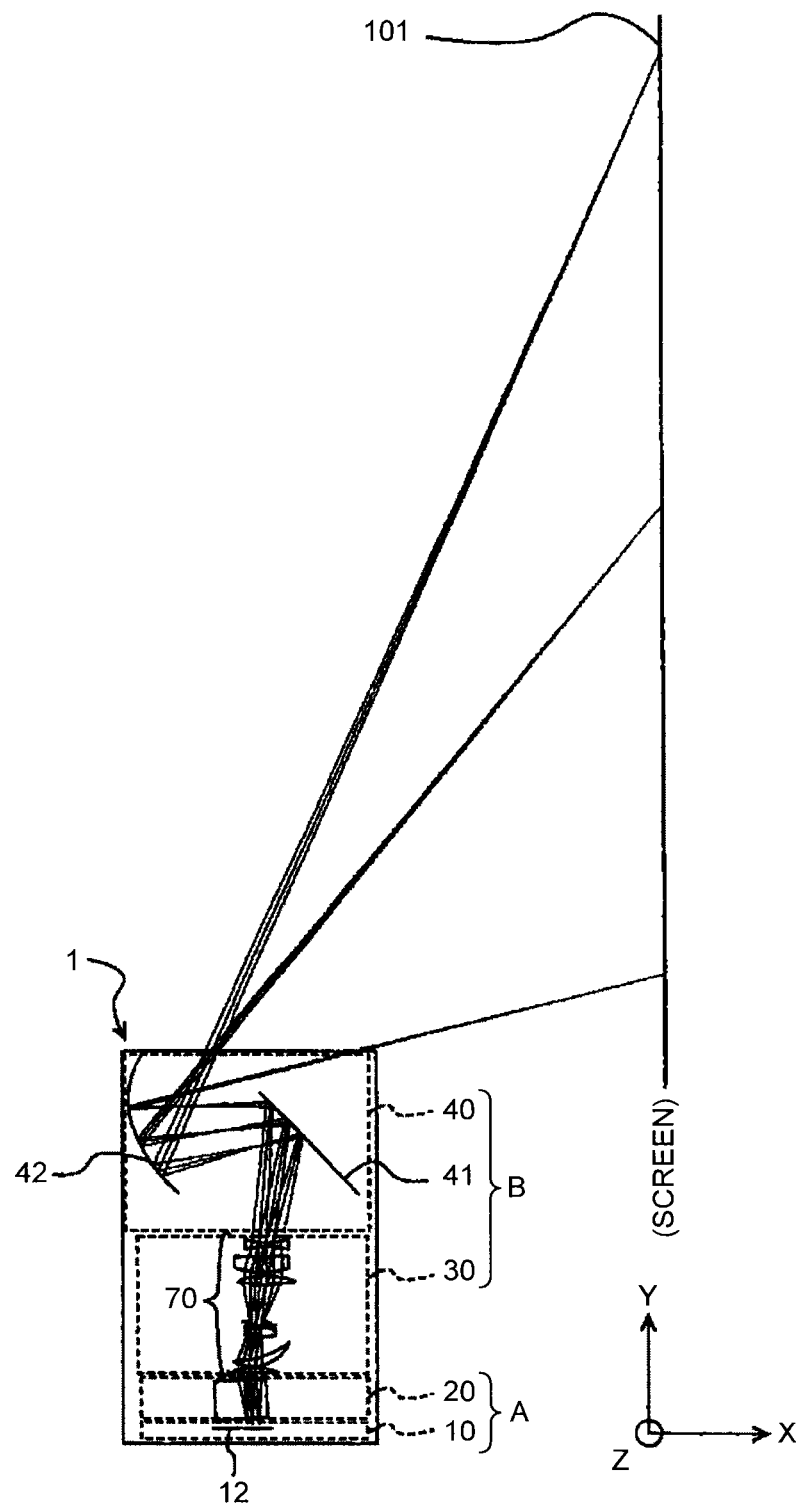
FIG. 2 is a schematic of an optical path from the projector to the projection surface.

FIG. 2 is a schematic of an optical path from the projector 1 to the projection surface 101.

The projector 1 includes a light source unit not illustrated and having a light source, and an image forming unit A that forms an image using light from the light source. The image forming unit A includes an image forming unit 10 having a digital mirror device (DMD) 12 as an image forming element, and an illumination unit 20 that folds the light from the light source to irradiate the DMD 12 with the light so that a light image is generated. The projector 1 also includes a projecting optical system B for projecting the image on the projection surface 101. The projecting optical system B is provided with at least one transmissive refractive optical system, and includes a first optical unit 30 having a first optical system 70 that is a coaxial system having a positive power, and a second optical unit 40 including a folding mirror 41 and a curved mirror 42 that has a positive power.

The DMD 12 is irradiated with the light from the light source not illustrated via the illumination unit 20, and generates an image by modulating the light with which the DMD 12 is irradiated via the illumination unit 20. The image generated by the DMD 12 is projected on the projection surface 101 via the first optical system 70 in the first optical unit 30, and the folding mirror 41 and the curved mirror 42 in the second optical unit 40.

Figure 3:
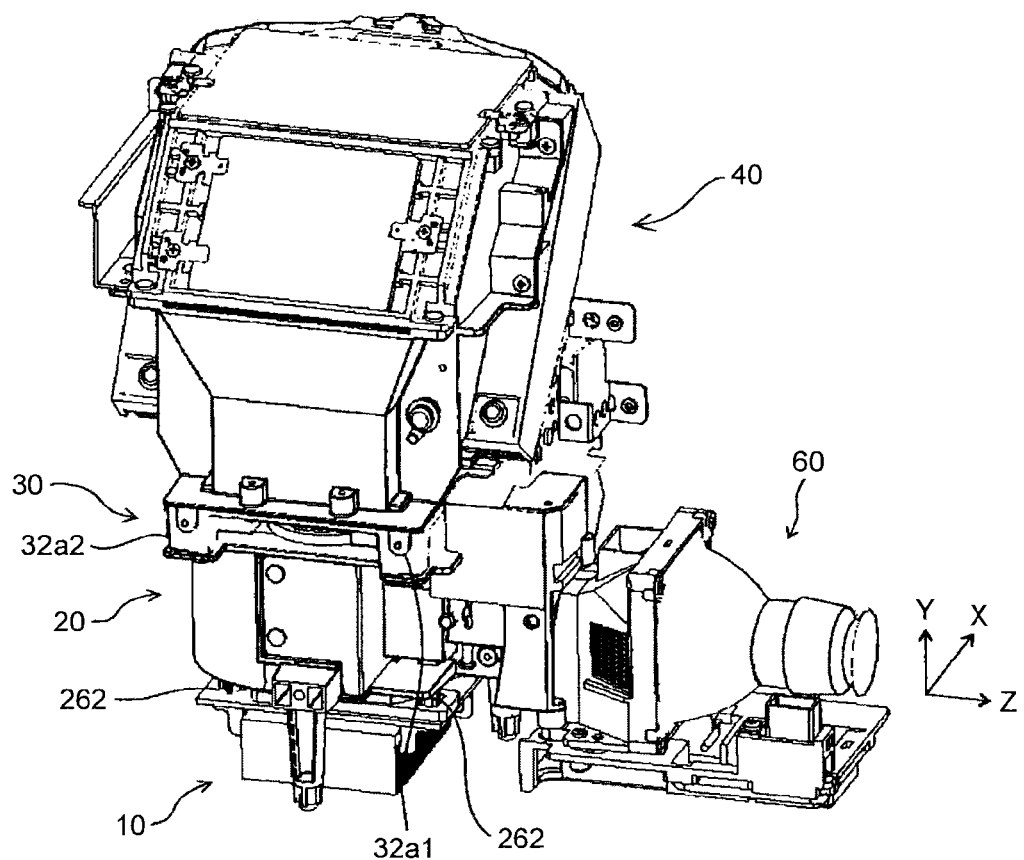
FIG. 3 is a schematic view illustrating a inside structure of the projector.

FIG. 3 is a schematic perspective view illustrating an internal structure of the projector 1.

As illustrated in FIG. 3, the image forming unit 10, the illumination unit 20, the first optical unit 30, and the second optical unit 40 are arranged along the Y direction, among the directions in parallel with the projection surface and the surface of the projected image in FIG. 3. The light source unit 60 is disposed on the right side of the illumination unit 20 in FIG. 3.

The reference numerals 32a1 and 32a2 illustrated in FIG. 3 indicate feet provided on a lens holder 32 included in the first optical unit 30. The reference numeral 262 indicates a screw fixing portion for fixing the image forming unit 10 to the illumination unit 20 using a screw.

A structure of each of these units will now be explained in detail.

To begin with, the light source unit 60 will be explained.

Figure 4:
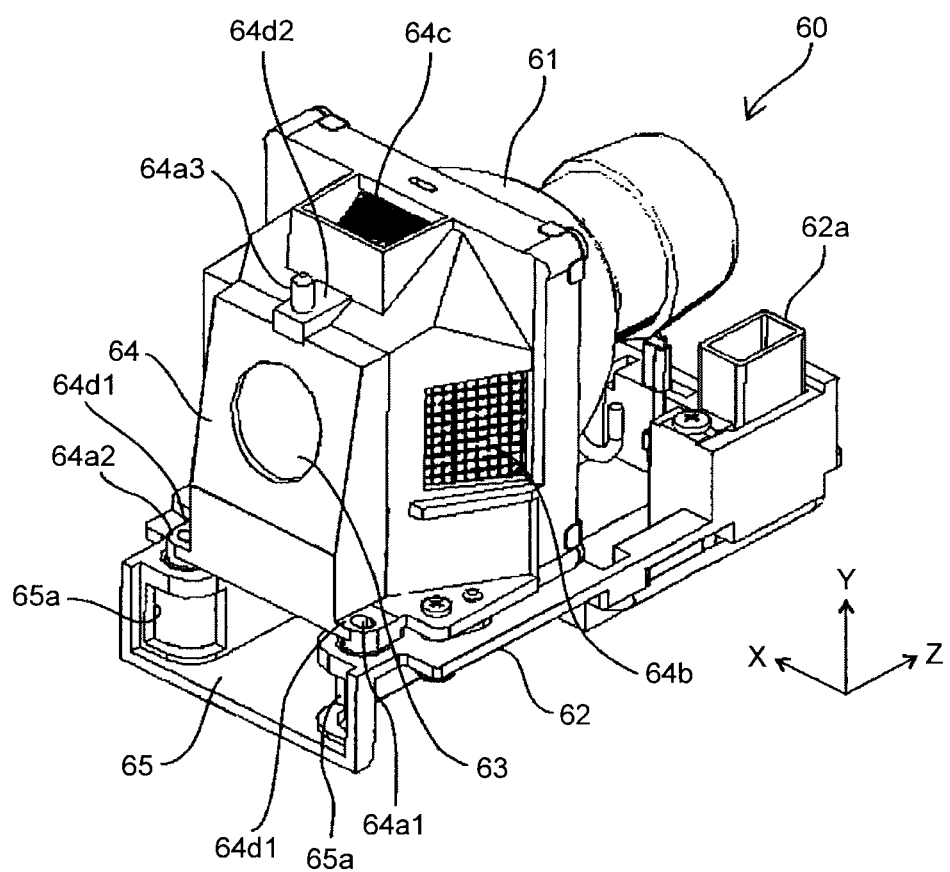
FIG. 4 is a schematic perspective view of the light source.

FIG. 4 is a schematic perspective view of the light source unit 60.

The light source unit 60 includes a light source bracket 62 on which a light source 61 such as a halogen lamp, a metal halide lamp, or a high-pressure mercury lamp is mounted. A connector 62a to which a power-supply side connector not illustrated and connected to a power unit 80 (see FIG. 28) is also provided on the light source bracket 62.

A holder 64 for holding a reflector not illustrated and the like is fixed to the light source bracket 62 with screws, on an outgoing side of the light from the light source 61. An exit window 63 is formed on a surface of the holder 64 located on the opposite side of where the light source 61 is provided. The light output from the light source 61 is collected to the exit window via the reflector that is not illustrated and is held by the holder, and output from the exit window 63.

Light source aligning portions 64a1 to 64a3 for aligning the light source unit 60 with respect to an illumination bracket 26 in the illumination unit 20 (see FIG. 6) are provided on the X-direction ends of the top surface and the bottom surface of the holder 64. The light source aligning portion 64a3 provided on the top surface of the holder 64 has a shape of a protrusion, and the two light source aligning portions 64a1, 64a2 provided on the bottom surface of the holder 64 have a shape of a hole.

A light source air inlet 64b for collecting the air for cooling the light source 61 is provided on each side surface of the holder 64, except for the top surface. Provided on the top surface of the holder 64 is a light source air outlet 64c for discharging the air heated by heat of the light source 61.

The light source bracket 62 also has a passage 65 for allowing the air suctioned by a suction blower 91 (see FIG. 21, for example), in a manner to be described later, to enter is provided. Provided on an incoming side of the passage 65, which is on the front side in FIG. 4, are openings 65a for allowing the air entered into the passage 65 to flow between the light source unit 60 and a removable cover 54 (see FIG. 18), which is to be described later. Cooling of the light source unit 60 will be described later.

As will be described later as well, a flat part 64d2 having the light source aligning portions (protrusions) 64a3 and flat parts 64d1 having the light source aligning portions (holes) 64a1, 64a2, respectively, illustrated in FIG. 4 function as abutting parts that abut against the illumination bracket when pressed by a pressing unit included in the removable cover.

The illumination unit 20 will now be explained.

Figure 5:
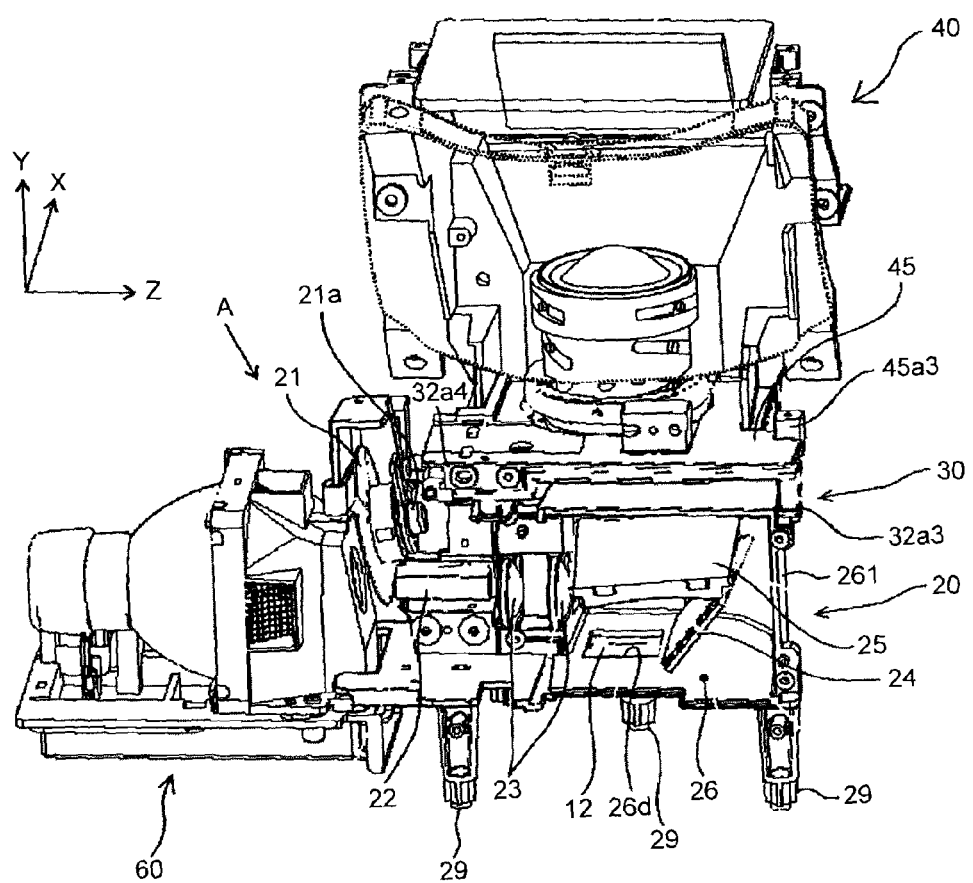
FIG. 5 is a perspective view illustrating optical system components provided in the illumination unit 20 along with other units.

FIG. 5 is a perspective view illustrating optical system components provided in the illumination unit 20 along with other units.

As illustrated in FIG. 5, the illumination unit 20 includes a color wheel 21, a light tunnel 22, two relay lenses 23, a cylinder mirror 24, and a concave mirror 25 that are supported by the illumination bracket 26. The illumination bracket 26 has a housing-like part 261 in which the two relay lenses 23, the cylinder mirror 24, and the concave mirror 25 are housed. Among the four sides of the housing-like part 261, only the right side in FIG. 5 has a side surface, and other three sides are open. An OFF light plate 27 (see FIG. 6) is mounted on an opening on the side located on the rear side in the X direction in FIG. 5. A cover member not illustrated in any of the drawings is attached to the side located on the front side in the X direction in FIG. 5. In this manner, the two relay lenses 23, the cylinder mirror 24, and the concave mirror 25 housed in the housing-like part 261 of the illumination bracket 26 is covered by the illumination bracket 26, the OFF light plate 27 (see FIG. 6), and the cover member not illustrated in any of the drawings.

An illumination penetrating hole 26*d* for allowing the DMD 12 to be exposed is provided on the bottom surface of the housing-like part 261 of the illumination bracket 26.

The illumination bracket 26 also includes three feet 29. These feet 29 abut against a base member 53 (see FIG. 18) of the projector 1, and supports the weight of the first optical unit 30 and the second optical unit 40 fixed to the illumination bracket 26 in a manner provided on top of each other. The feet 29 are also provided to form a space for allowing external air to flow into a heat sink 13 (see FIG. 6) being a cooler for cooling the DMD 12 in the image forming unit 10, in a manner to be described later.

The reference numerals 32*a*3, 32*a*4 in FIG. 5 indicate feet of the lens holder 32 in the first optical unit 30, and the reference numeral 45*a*3 indicates a threaded receptacle 45*a*3 on the second optical unit 40.

Figure 6:
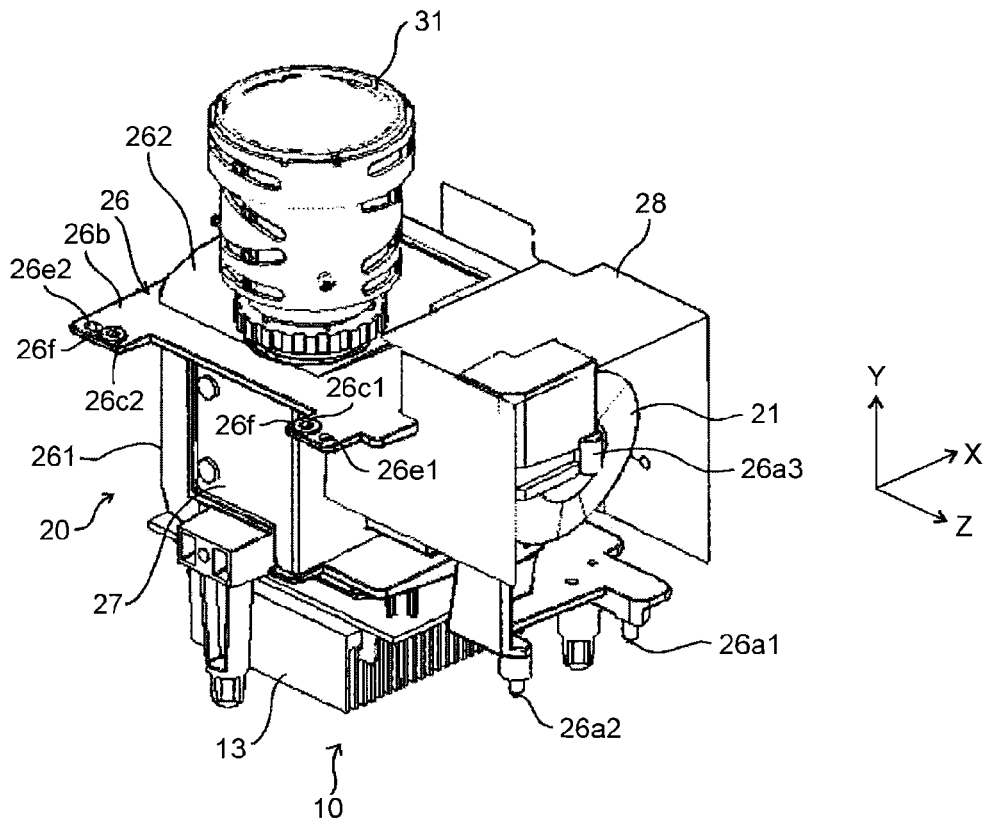
FIG. 6 is a perspective view of the illumination unit, a projection lens unit, the image forming unit viewed from the direction of A illustrated in FIG. 5.

FIG. 6 is a perspective view of the illumination unit 20, a projection lens unit 31, the image forming unit 10 viewed from the direction of A illustrated in FIG. 5.

Provided on the upper part of the housing-like part 261 of the illumination bracket 26 is a top surface 26*b* perpendicularly intersecting with the Y direction in FIG. 6. At four corners of the top surface 26*b*, penetrating holes through which screws for fastening the first optical unit 30 are provided (in FIG. 6, only penetrating holes 26*c*1 and 26*c*2 are illustrated, and the remaining penetrating holes are not illustrated). Aligning holes 26*e*1, 26*e*2 for aligning the first optical unit 30 with respect to the illumination unit 20 are also provided at respective positions adjacent to the penetrating holes 26*c*1, 26*c*2 located on the front side in the X direction in FIG. 6. Among the two aligning holes provided on the front side in the X direction in FIG. 6, the aligning holes 26*e*1 near where the color wheel 21 is disposed is used as a main reference in the alignment, and has a shape of a circular hole. The aligning holes 26*e*2 provided on the opposite side of where the color wheel 21 is disposed is used as a sub-reference in the alignment, and has a shape of a long hole extending in the Z direction. A peripheral of each of the penetrating holes 26*c*1, 26*c*2 is formed as an aligning protrusion 26*f* for aligning the first optical unit 30 in the Y direction, and protrudes from the top surface 26*b* of the illumination bracket 26. If the positioning precision in the Y direction is to be increased without providing the aligning protrusions 26*f*, the flatness of the entire top surface of the illumination bracket 26 needs to be increased. Therefore, a cost increases. By contrast, when the aligning protrusions 26*f* are provided, because the flatness needs to be increased on the aligning protrusions 26*f* only, the positioning precision in the Y direction can be increased while suppressing the cost.

Provided on an opening on the top surface of the illumination bracket 26 is a douser 262 that prevents light from entering the housing-like part 261 from above and with which the bottom part of the projection lens unit 31 is engaged.

A cutout is formed between the penetrating holes 26*c*1, 26*c*2 provided on the top surface 26*b* of the illumination bracket 26, so that the second optical unit 40 can be fixed to the first optical unit 30 using screws without being obstructed, in a manner to be described later.

Provided on an end of the illumination bracket 26 on the side of the color wheel 21 (on the front side in the Z direction in FIG. 6) is a tubular light source portion-to-be-aligned 26*a*3 having a penetrating hole extending in a up-and-down direction in which the light source aligning portion 64*a*3 (see FIG. 4) provided as a protrusion on the top surface of the holder 64 in the light source unit 60 is engaged. Provided below the light source portion-to-be-aligned 26*a*3 are two light source portions-to-be-aligned 26*a*1, 26*a*2 each of which has a shape of a protrusion and that are respectively engaged with the two light source aligning portions 64*a*1, 64*a*2 each having a shape of a hole and provided on the light source bracket 62 in the holder 64. When the three light source aligning portions 64*a*1 to 64*a*3 on the holder 64 are respectively engaged with the three light source portions-to-be-aligned 26*a*1 to 26*a*3 provided to the illumination bracket 26 in the illumination unit 20, the light source unit 60 is aligned and fixed to the illumination unit 20 (see FIG. 3).

To the illumination bracket 26, an illumination cover 28 for covering the color wheel 21 and the light tunnel 22 is also attached.

Figure 7:
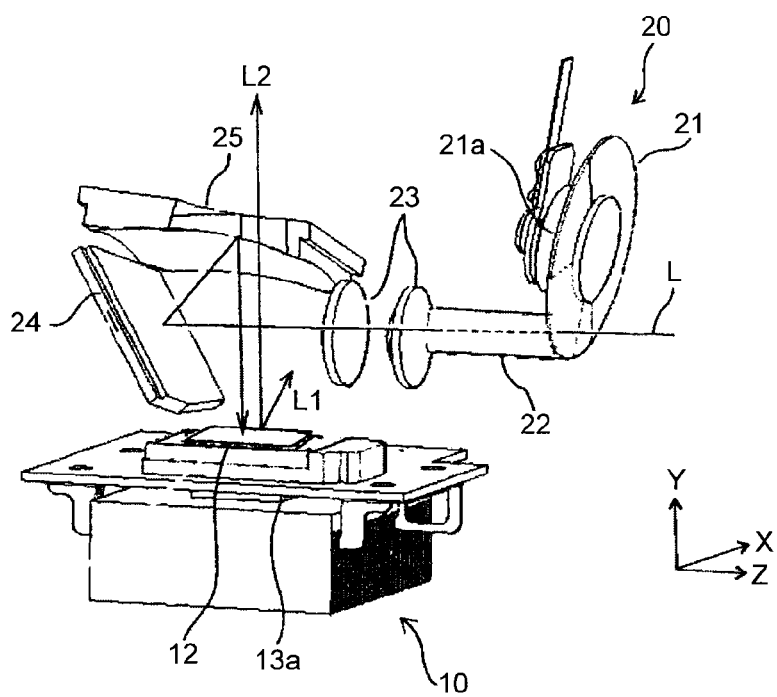
FIG. 7 is a schematic for explaining an optical path L of the light within the illumination unit.

FIG. 7 is a schematic for explaining an optical path L of the light within the illumination unit 20.

The color wheel 21 has a shape of a disk, and is fixed to a motor shaft of a color motor 21*a*. The color wheel 21 has filters, such as those in red (R), green (G), blue (B), and the like, in a rotating direction. The light collected by the reflector not illustrated and provided on the holder 64 in the light source unit 60 passes through the exit window 63, and reaches the edge of the color wheel 21. The light having reached the edge of the color wheel 21 is time-divided by the rotating color wheel 21 into R light, G light, and B light.

The light divided by the color wheel 21 becomes incident on the light tunnel 22. The light tunnel 22 has a shape of a rectangular tube, and has mirrors on the internal surface. The light incident on the light tunnel 22 is reflected a plurality of number of times on the internal surface of the light tunnel 22, homogenized into a plane light source, and goes out toward the relay lenses 23.

The light having passed through the light tunnel 22 then passes through the two relay lenses 23, is reflected by the cylinder mirror 24 and the concave mirror 25, and collected and imaged on the image generating surface of the DMD 12.

Figure 8:
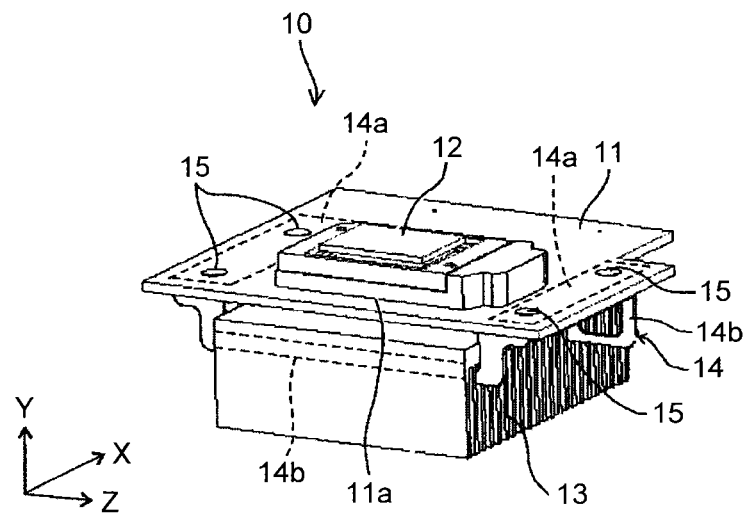
FIG. 8 is a perspective view of the image forming unit.

The image forming unit 10 will now be explained. FIG. 8 is a perspective view of the image forming unit 10.

As illustrated in FIG. 8, the image forming unit 10 includes a DMD board 11 on which the DMD 12 is mounted. The DMD 12 is mounted on a socket 11*a* provided on the DMD board 11 so that an image forming surface on which micromirrors are arranged in a grid-like arrangement is faced upwardly. The DMD board 11 includes a driving circuit for driving the DMD mirrors. To the rear side of the DMD board 11 (the surface on the opposite side of the surface on which the socket 11*a* is provided), the heat sink 13 being a cooler for cooling the DMD 12 is fixed. A part of the DMD board 11 on which the DMD 12 is mounted has a penetrating hole. The heat sink 13 has a protrusion 13a (see FIG. 7) inserted into the penetrating hole not illustrated. The tip of the protrusion 13a is flat. By inserting the protrusion 13a into the penetrating hole not illustrated, the flat part located at the tip of the protrusion 13a abuts against the rear surface of the DMD 12 (the surface opposite of the image generating surface). An elastically deformable heat-transfer sheet may be pasted on the flat part or a part of the rear surface of the DMD 12 against which the heat sink 13 abuts, so that the adhesion between the flat part of the protrusion 13a and the rear surface of the DMD 12 increases, further to increase the heat conductivity.

The heat sink 13 is pressed against and fixed by a fixing member 14 to a surface of the DMD board 11 on the opposite side of a surface on which the socket 11a is provided. The fixing member 14 includes a plate-like fixing portion 14a that faces a right part of the rear surface of the DMD board 11 in FIG. 8, and another plate-like fixing portion 14a that faces a left part of the rear surface of the DMD board 11 in FIG. 8. A pressing portion 14b is provided near one end and the other end of each of the fixing portions in the X direction, in a manner connecting the right and the left fixing portions.

The heat sink 13 is pressed against and fixed by the fixing member 14 to the surface of the DMD board 11 on the opposite side of the surface where the socket 11a is provided, when the image forming unit 10 is fixed to the illumination bracket 26 (see FIG. 6) using screws.

Explained below is how the image forming unit 10 is fixed to the illumination bracket 26. To begin with, the image forming unit 10 is aligned with respect to the illumination bracket 26 so that the DMD 12 faces the illumination penetrating hole 26d provided on the bottom of the illumination bracket 26 in the illumination unit 20, as illustrated earlier in FIG. 5. A screw is then inserted into each penetrating hole not illustrated and provided on the fixing portions 14a, and into each of the penetrating holes 15 on the DMD board 11, from underneath in FIG. 8, and the screw is fastened with a threaded hole provided on the bottom of the screw fixing portion 262 (see FIG. 3) provided on the illumination bracket 26, so that the image forming unit 10 is fixed to the illumination bracket 26. As the screw is fastened with the screw fixing portion 262 provided on the illumination bracket 26, the pressing portion 14b is caused to press the heat sink 13 against the DMD board. In this manner, the heat sink 13 is pressed against and fixed to the surface of the DMD board 11 on the opposite side of the surface on which the socket 11a is provided, by the fixing member 14.

In this manner, the image forming unit 10 is fixed to the illumination bracket 26, and the three feet 29 illustrated in FIG. 5 which is mentioned earlier come to support the weight of the image forming unit 10 as well.

On the image generating surface of the DMD 12, a plurality of movable micromirrors are arranged in a grid-like arrangement. The mirror surface of each of the micromirrors can be tilted by a given angle about a rotational axis, so that two states of "ON" and "OFF" can be provided. While a micromirror is "ON", the micromirror reflects the light from the light source 61 toward the first optical system 70 (see FIG. 2), as illustrated in an arrow L2 in FIG. 7 which is mentioned earlier. When the micromirror is "OFF", the micromirror reflects the light from the light source 61 toward the OFF light plate 27 supported on the side of the illumination bracket 26 illustrated in FIG. 6 mentioned earlier (see an arrow L1 in FIG. 7). Therefore, by driving each of the mirrors independently, projection of light can be controlled for each pixel in image data, and, in this manner, an image can be generated.

The light reflected toward the OFF light plate 27 not illustrated is turned into heat and absorbed, and cooled by an external airflow.

The first optical unit 30 will now be explained.

Figure 9:
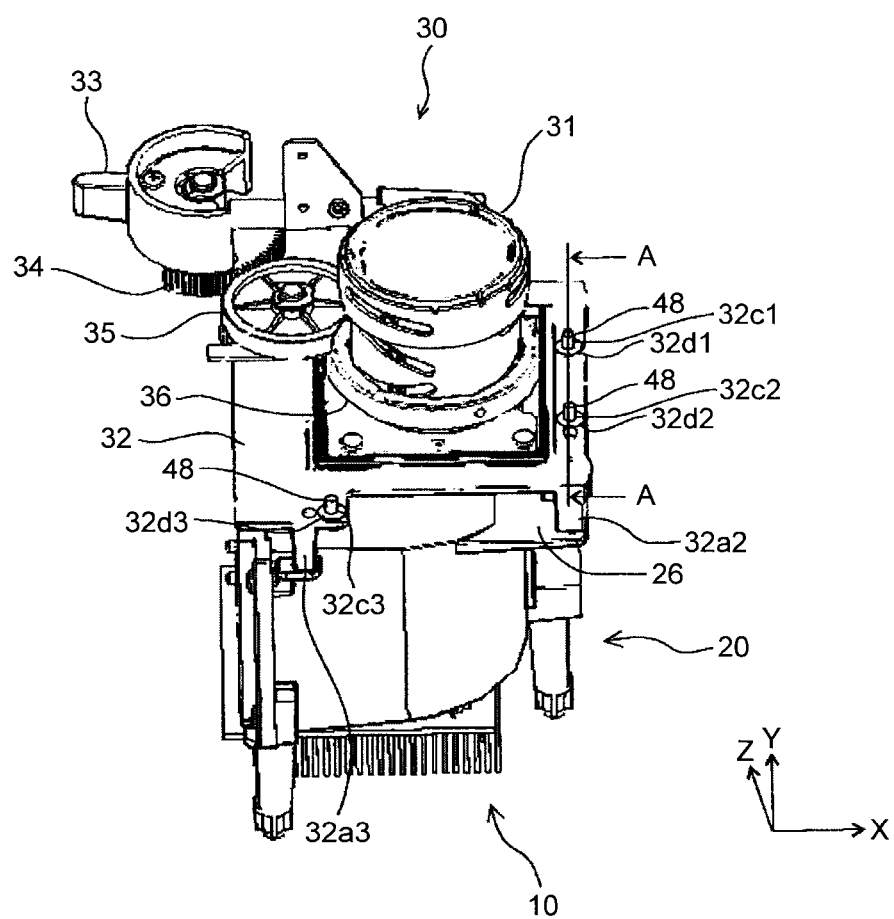
FIG. 9 is a perspective view illustrating the first optical unit, along with the illumination unit and the image forming unit.

FIG. 9 is a perspective view illustrating the first optical unit 30, along with the illumination unit 20 and the image forming unit 10.

As illustrated in FIG. 9, the first optical unit 30 is provided above the illumination unit 20, and includes the projection lens unit 31 holding the first optical system 70 (see FIG. 2) including a plurality of lenses, and the lens holder 32 for holding the projection lens unit 31. The lens holder 32 has four feet 32a1 to 32a4 extending downwardly (only the feet 32a2 and 32a3 are illustrated in FIG. 9; see FIG. 3 for the foot 32a1, and see FIG. 5 for the foot 32a4). Formed on the bottom of each of the feet 32a1 to 32a4 is a threaded hole to be fixed to the illumination bracket 26 with a screw.

The projection lens unit 31 also includes a focus gear 36. An idler gear 35 meshes with the focus gear 36. A lever gear 34 meshes with the idler gear 35, and the focus lever 33 is fixed to the rotating shaft of the lever gear 34. The tip of the focus lever 33 is exposed from the main apparatus illustrated in FIG. 1 mentioned earlier.

When the focus lever 33 is moved, the focus gear 36 is rotated via the lever gear 34 and the idler gear 35. When the focus gear 36 is rotated, the lenses included in the first optical system 70 in the projection lens unit 31 are moved in predetermined directions, respectively, to enable the focus of the projected image to be adjusted.

The lens holder 32 has four screw penetrating holes 32c1 to 32c3 each of which a screw 48 for fixing the second optical unit 40 to the first optical unit 30 is passed through (in FIG. 9, only the three screw penetrating holes are illustrated, and the screw 48 is passed through each of the screw penetrating holes 32c1 to 32c3. The tip of the threaded part of each of the screws 48 is visible). Provided around each of the screw penetrating holes 32c1 to 32c3 is a corresponding second optical unit aligning protrusion 32d1 to 32d3 protruding from a surface of the lens holder 32 (32d1 to 32d3 are illustrated in FIG. 9).

Figure 10:
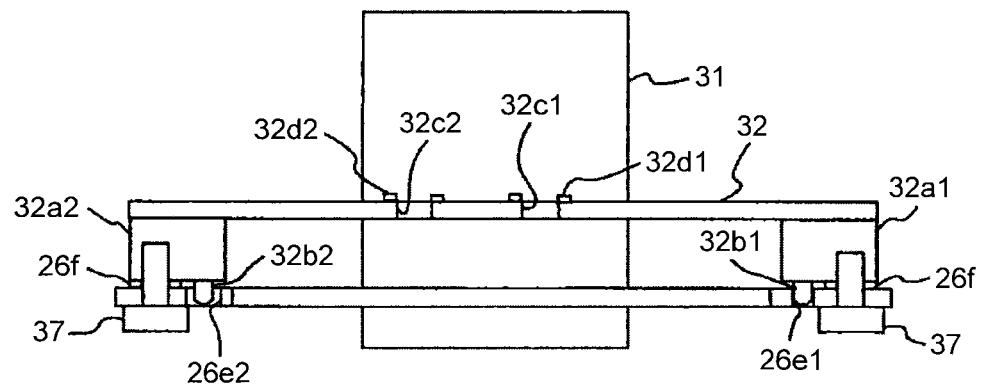
FIG. 10 is a cross-sectional view across A-A illustrated in FIG. 9.
Figure 10:
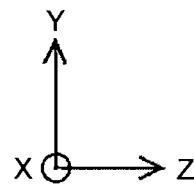

FIG. 10 is a cross-sectional view across A-A illustrated in FIG. 9.

As illustrated in FIG. 10, the feet 32a1, 32a2 have protrusions-to-be-aligned 32b1, 32b2, respectively. The protrusion-to-be-aligned 32b1 on the right side in FIG. 10 is passed through the aligning hole 26e1 in a shape of a circular hole provided on the top surface 26b of the illumination bracket 26 being the main reference for the alignment. The protrusion-to-be-aligned 32b2 on the left side in FIG. 10 is passed through the aligning hole 26e2 in a shape of a long hole and being the sub-reference for the alignment. In this manner, the first optical unit 30 is aligned with respect to the illumination unit 20 in the Z axis direction and the X axis direction. A screw 37 is inserted into each of the penetrating holes 26c1 to 26c4 provided on the top surface 26b of the illumination bracket 26, and fastened to the threaded hole provided on each of the feet 32a1 to 32a4 of the lens holder 32. In this manner, the first optical unit 30 is aligned and fixed to the illumination unit 20.

The part of the projection lens unit 31 located above the lens holder 32 is covered by a mirror holder 45 included in the second optical unit, which will be described later (see FIG. 12). As illustrated in FIG. 3 mentioned earlier, the part of the projection lens unit 31 below the lens holder 32, that is a part between the lens holder 32 and the top surface 26b of the illumination bracket 26 in the illumination unit 20 is exposed, but because the projection lens unit 31 is engaged with the lens holder 32, no light enters the optical path of the image from the part exposed.

The second optical unit 40 will now be explained.

Figure 11:
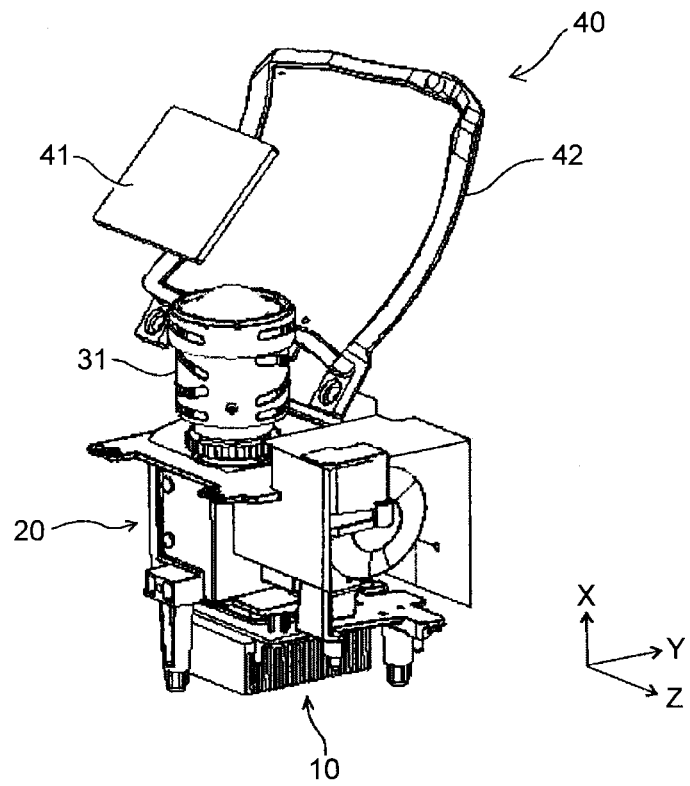
FIG. 11 is a perspective view illustrating a second optical system included in the second optical unit, along with the projection lens unit, the illumination unit, and the image forming unit.

FIG. 11 is a perspective view illustrating a second optical system included in the second optical unit 40, along with the projection lens unit 31, the illumination unit 20, and the image forming unit 10.

As illustrated in FIG. 11, the second optical unit 40 includes the folding mirror 41 and the curved mirror 42 having a shape of a concave, and these two make up the second optical system. The light-reflecting surface of the curved mirror 42 may be a spherical surface, a rotationally symmetric aspheric surface, or a free-form surface.

Figure 12:
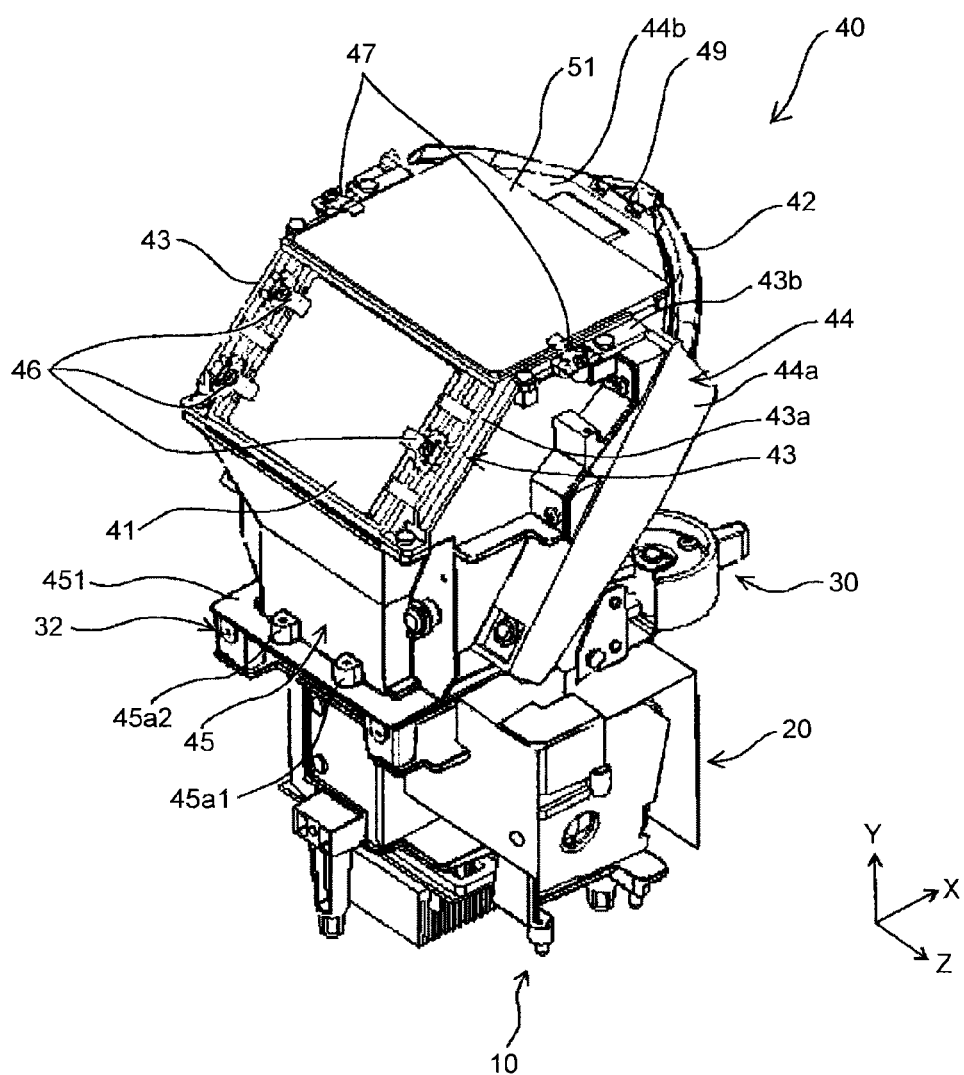
FIG. 12 is a perspective view illustrating the second optical unit, along with the first optical unit, the illumination unit, and the image forming unit.

FIG. 12 is a perspective view illustrating the second optical unit 40, along with the first optical unit 30, the illumination unit 20, and the image forming unit 10.

As illustrated in FIG. 12, the second optical unit 40 also includes the transmissive glass 51 that passes through the light image reflected on the curved mirror 42, and protects the optical system components inside of the apparatus from dusts.

The second optical unit 40 includes a mirror bracket 43 for holding the folding mirror 41 and the transmissive glass 51, a free mirror bracket 44 for holding the curved mirror 42, and the mirror holder 45 on which the mirror bracket 43 and the free mirror bracket 44 are mounted.

The mirror holder 45 has a shape of a box that opens to the top, to the bottom, and to the rear in the X direction in FIG. 12, and has a general U shape when viewed from the top. An edge extending on each of the front side and the rear side of the top opening of the mirror holder 45 in the Z direction and extending the X direction includes a inclined part inclined having a height increasing from the front side in the X direction toward the rear side in the X direction in FIG. 12, and a parallel part extending in parallel with the X direction in FIG. 12. The inclined part is provided on the front side of the parallel part in the X direction in FIG. 12. An edge of the top opening of the mirror holder 45 located on the front side in the X direction in FIG. 12 and extending along the Z direction is in parallel with the Z direction in FIG. 12.

The mirror bracket 43 is mounted on the upper part of the mirror holder 45. The mirror bracket 43 includes an inclined surface 43a that is inclined in the manner rising from a front edge abutting against the inclined part of the edge of the top opening of the mirror holder 45 toward the rear side in the X direction in FIG. 12, and a parallel surface 43b abutting against the parallel part of the edge of the top opening of the mirror holder 45 and extending in parallel with the X direction. Each of the inclined surface 43a and the parallel surface 43b has an opening. The mirror bracket 43 holds the folding mirror 41 whereby closing the opening on the inclined surface 43a, and holds the transmissive glass 51 whereby closing the opening on the parallel surface 43b.

Both of the Z-direction ends of the folding mirror 41 are pressed against the inclined surface 43a by mirror pressing members 46 each functioning like a plate spring. In this manner, the folding mirror 41 is aligned and fixed to the inclined surface 43a of the mirror bracket 43. One of the Z-direction side ends of the folding mirror 41 is fixed with two of the mirror pressing members 46, and the other side end is fixed with the mirror pressing member 46 in singularity.

Both of the Z-direction ends of the transmissive glass 51 are pressed against the parallel surface 43b of the mirror bracket 43 by glass pressing members 47 each functioning like a plate spring. In this manner, the transmissive glass 51 is aligned and fixed to the mirror bracket 43. Each of the Z-direction ends of the transmissive glass 51 is held by the glass pressing member 47 in singularity.

The free mirror bracket 44 for holding the curved mirror 42 includes arms 44a on the front side and the rear side in the Z axis direction. Each of the arms is inclined in a manner coming down from the rear side toward the front side in the X direction in FIG. 12. The free mirror bracket 44 also has a connector 44b for connecting these two arms across the upper parts of the arms 44a. The arms 44a of the free mirror bracket 44 are attached to the mirror holder 45 so that the opening on the rear side of the mirror holder 45 in the X direction in FIG. 12 is covered by the curved mirror 42.

An approximate center of the curved mirror 42 on the side of the transmissive glass 51 is pressed against the connector 44b of the free mirror bracket 44 by a free mirror pressing member 49 functioning like a plate spring. Both ends of the curved mirror 42 on the side of the first optical system in the Z axis direction in FIG. 12 are respectively fixed to the arms 44a of the free mirror bracket 44 with screws.

The second optical unit 40 is provided on top of the lens holder 32 of the first optical unit 30, and fixed to the lens holder 32. Specifically, provided on the lower part of the mirror holder 45 is bottom surface 451 that faces the top surface of the lens holder 32, and the bottom surface 451 is provided with four threaded receptacles 45a1 to 45a3 each of which has a tubular shape and fixed to the first optical unit 30 with screws (for the threaded receptacles 45a1, 45a2, see FIG. 11; see FIG. 5 for the threaded receptacle 45a3; the remaining threaded receptacle is not illustrated). A screw 48 is passed through each of the screw penetrating holes 32c1 to 32c3 provided on the lens holder 32 in the first optical unit 30, and fastened to corresponding one of the threaded receptacles 45a1 to 45a3. In this manner, the second optical unit 40 is fixed to the first optical unit 30 with screws. At this time, the bottom surface of the mirror holder 45 in the second optical unit 40 abuts against the second optical unit aligning protrusions 32d1 to 32d4 on the lens holder 32. In this manner, the second optical unit 40 is aligned and fixed in the Y direction.

When the second optical unit 40 is provided on top of and fixed to the lens holder 32 of the first optical unit 30, the part of the projection lens unit 31 located above the lens holder 32 is housed in the mirror holder 45 in the second optical unit 40, as illustrated in FIG. 9 in a manner mentioned earlier. Furthermore, when the second optical unit 40 is provided on top of and fixed to the lens holder 32, a gap is formed between the curved mirror 42 and the lens holder 32, and the idler gear 35 is inserted into the gap (see FIG. 9).

Figure 13:
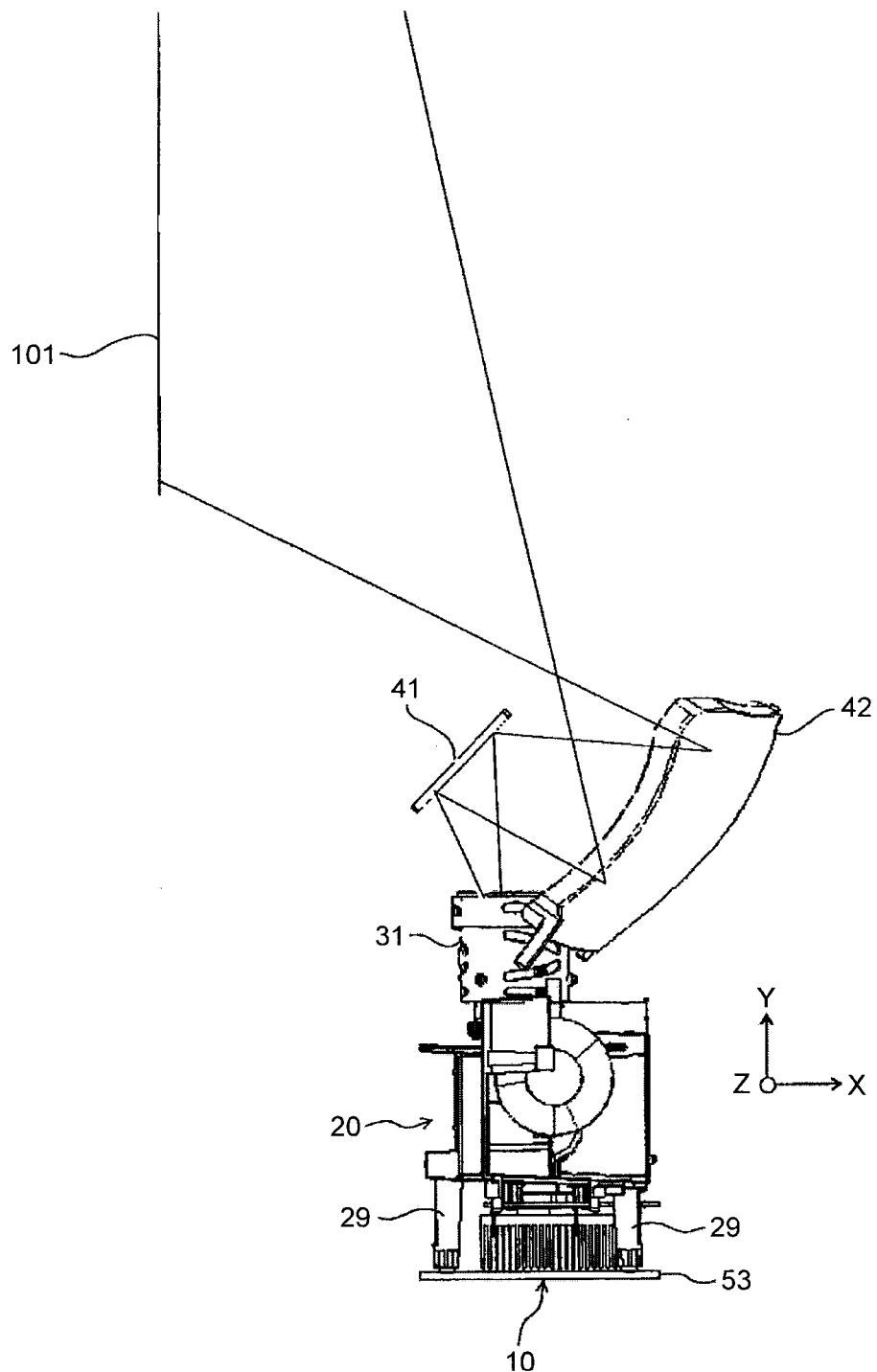
FIG. 13 is a perspective view illustrating an optical path from the first optical system to the projection surface (screen)

FIG. 13 is a perspective view illustrating an optical path from the first optical system 70 to the projection surface 101 (screen).

A light beam passed through the projection lens unit 31 included in the first optical system 70 forms an intermediate image that is in a conjugate relation with the image generated by the DMD 12 between the folding mirror 41 and the curved mirror 42. The intermediate image is imaged as a curved-surface image between the folding mirror 41 and the curved mirror 42. The light image then becomes incident on the concaved curved mirror 42. The intermediate image is then converted into a "further enlarged image" by the curved mirror 42, and projected and imaged on the projection surface 101.

In the manner described above, because the projecting optical system includes the first optical system 70 and the second optical system, and the intermediate image is formed between the first optical system 70 and the curved mirror 42 in the second optical system, and enlarged and projected by the curved mirror 42, the projection distance can be reduced, and the projector can be used in a small meeting room or the like.

Furthermore, the first optical unit 30 and the second optical unit 40 are provided on top of and fixed to the illumination bracket 26, as illustrated in FIG. 13, and the image forming unit 10 is fixed to the illumination bracket 26. Therefore, these units are fixed to the base member 53 while the feet 29 on the illumination bracket 26 support the weight of the first optical unit 30, the second optical unit 40, and the image forming unit 10.

Figure 14:
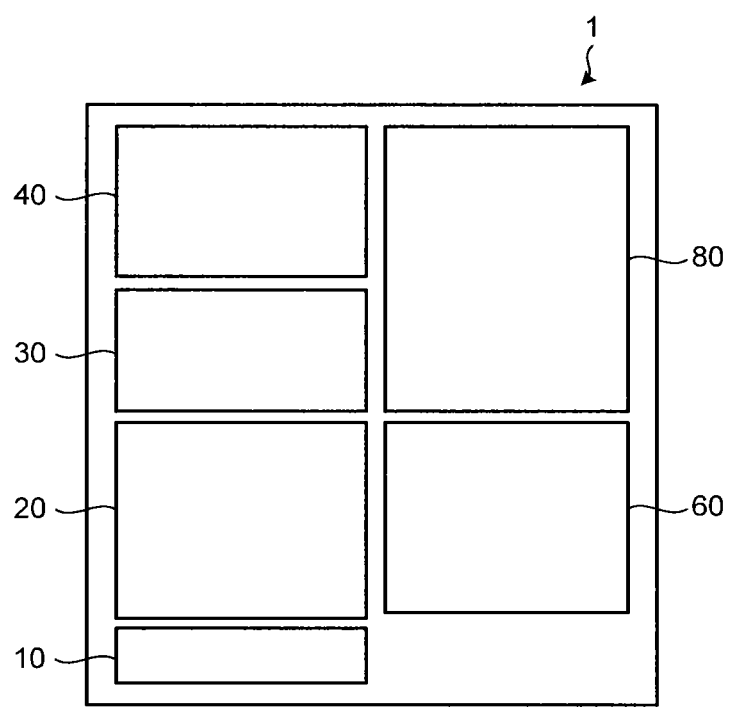
FIG. 14 is a schematic illustrating a positional relation between each of the units in the apparatus.
Figure 14:
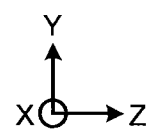

FIG. 14 is a schematic illustrating a positional relation between each of the units in the apparatus.

As illustrated in FIG. 14, the image forming unit 10, the illumination unit 20, the first optical unit 30, and the second optical unit 40 are provided on top of each other in the Y direction that is the short axis direction of the projection surface, and the light source unit 60 is provided in the Z direction that is the long axis direction of the projection surface with respect to the image forming unit 10, the illumination unit 20, the first optical unit 30, and the second optical unit 40 provided on top of each other. In this manner, according to the embodiment, the image forming unit 10, the illumination unit 20, the first optical unit 30, the second optical unit 40, and the light source unit are arranged along the Y direction or the Z direction that are directions in parallel with the projected image and the projection surface 101. More specifically, the light source unit 60 is connected to the image forming unit A in a direction perpendicular to a direction in which the projecting optical system B, including the first optical unit 30 and the second optical unit 40, is provided on top of the image forming unit A, including the image forming unit 10 and the illumination unit 20. Furthermore, the image forming unit A and the light source unit 60 are arranged along the same line that is in parallel with the base member 53. Furthermore, the image forming unit A and the projecting optical system B are arranged along the same line that is perpendicular to the base member 53, in an order of the image forming unit A and the projecting optical system B, from the side of the base member 53.

Furthermore, in the embodiment, the light source 61 and the power unit 80 for supplying power to the DMD 12 are provided above the light source unit 60. The light source unit 60, the power unit 80, the image forming unit A, and the projecting optical system B are enclosed by an enclosure of the projector 1 that is to be described later and includes the top surface of the projector mentioned above, the base member 53, and an outer cover 59 surrounding the projector 1 (see FIG. 18).

Figure 15:
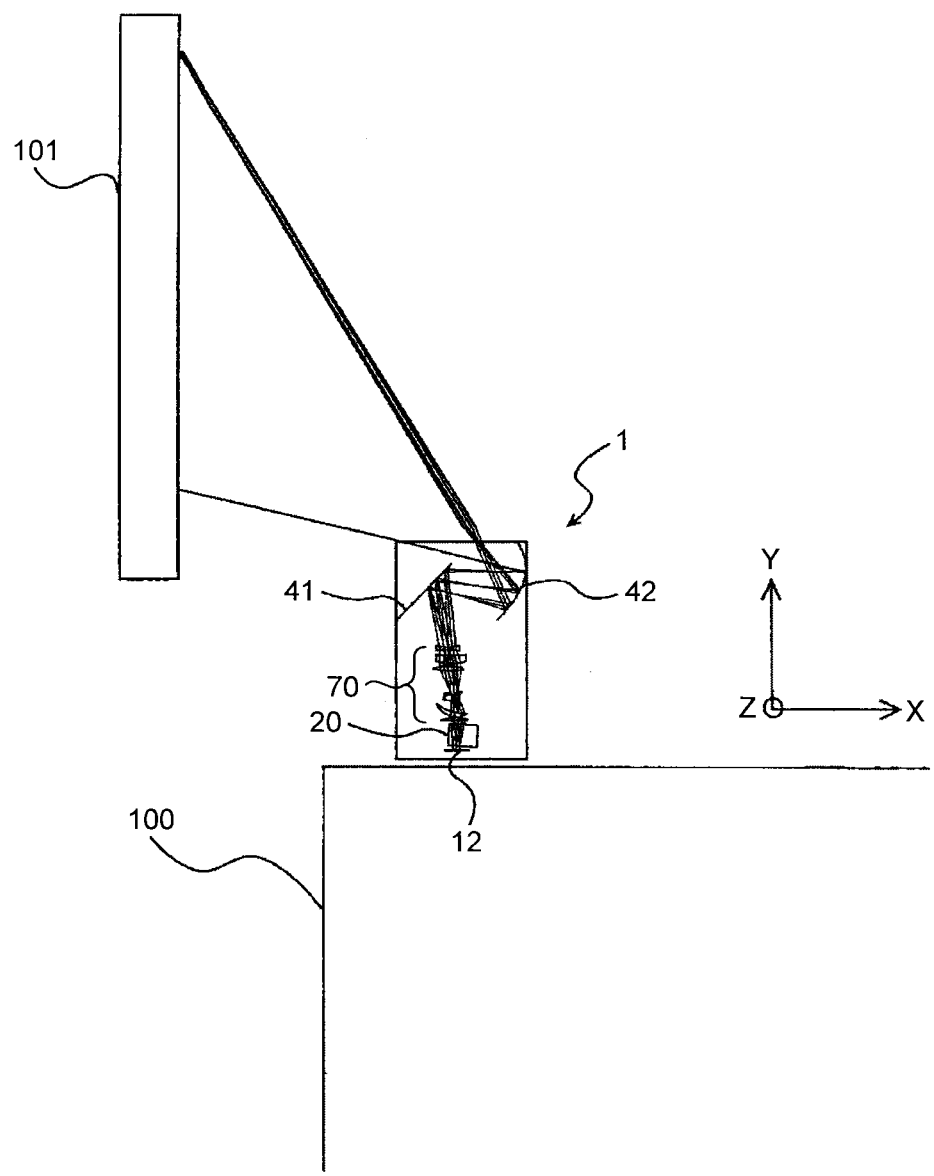
FIG. 15 is a schematic of an example illustrating how the projector according to the embodiment is used.
Figure 16:
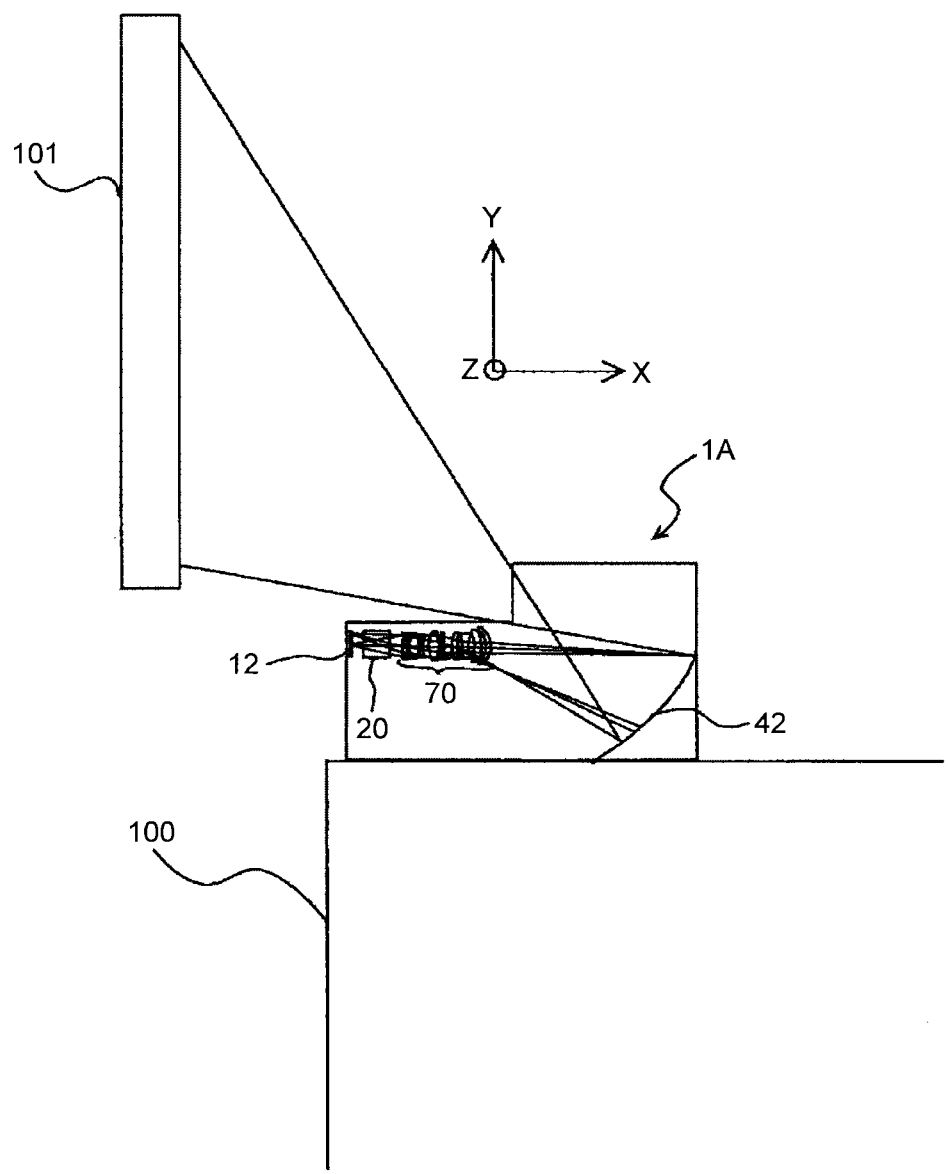
FIG. 16 is a schematic of an example illustrating how a conventional projector is used.
Figure 17:
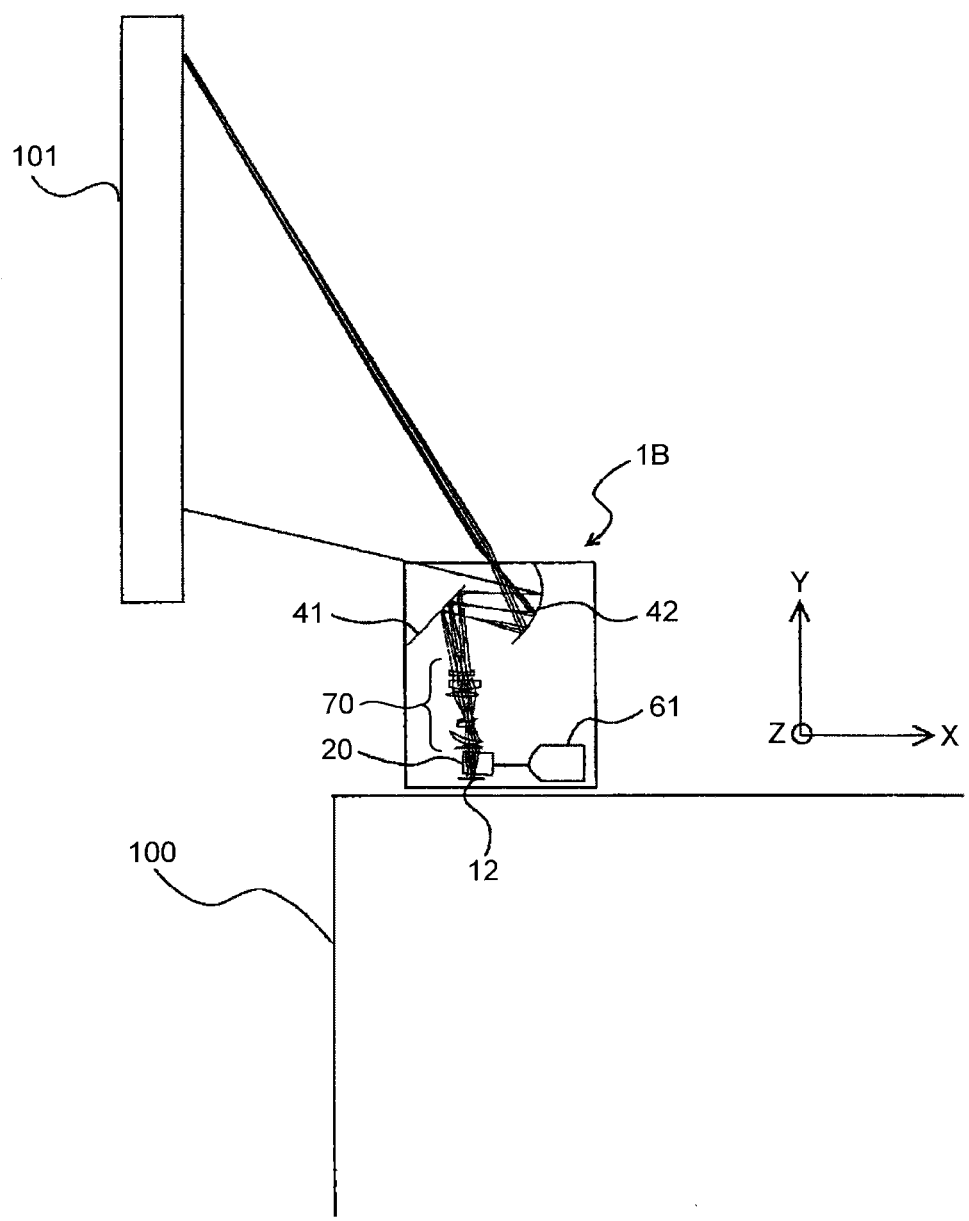
FIG. 17 is a schematic of an example illustrating the light source and illumination unit are arranged in a direction perpendicular to the plane of the projected image projected on the projection surface.

FIG. 15 is a schematic of an example illustrating how the projector 1 according to the embodiment is used. FIGS. 16 and 17 are schematics of examples illustrating how a conventional projector 1A is used.

As illustrated in FIGS. 15 to 17, when the projector 1 is to be used in a meeting room, for example, the projector 1 is used in a manner placed on a table 100, projecting an image on the projection surface 101 such as a whiteboard.

As illustrated in FIG. 16, in the conventional projector 1A, the DMD 12 (image generating element), the illumination unit 20, the first optical system 70, and the second optical system (the curved mirror 42) are arranged serially, along a direction perpendicular to the surface of the projected image projected on the projection surface 101. Therefore, the projector 1A is extended in the direction perpendicular to the projection surface (in the X direction), and the projector 1A takes up a space in the direction perpendicular to the projection surface 101. Because chairs and tables used by people viewing the image projected on the projection surface 101 are generally arranged in the direction perpendicular to the projection surface, if the projector takes up a space in the direction perpendicular to the projection surface, the space for placing chairs and tables is limited by that amount, and a convenience is reduced.

In a projector 1B illustrated in FIG. 17, the DMD 12 (image forming element), the illumination unit 20, and the first optical system 70 are arranged serially, in a direction parallel with a plane of the projected image projected on the projection surface 101. Therefore, the length in the direction perpendicular to the projection surface 101 can be reduced, compared with the projector 1B illustrated in FIG. 18. However, in the projector 1B illustrated in FIG. 17, the light source 61 is arranged in a direction perpendicular to the plane of the projected image projected on the projection surface 101 with respect to the illumination unit 20. Therefore, the length of the projector in the direction perpendicular to the projection surface 101 cannot be reduced sufficiently.

By contrast, in the projector 1 according to the embodiment illustrated in FIG. 15, the image forming unit A including the image forming unit 10 and the illumination unit 20 and the projecting optical system B including the first optical unit 30 and the folding mirror 41 are arranged serially in the Y direction in FIG. 15, among the directions in parallel with the projection surface 101 and the image plane of the projected image projected on the projection surface 101. Furthermore, the light source unit 60 and the illumination unit 20 are arranged serially in the Z direction in FIG. 15, among the directions in parallel with the plane of the projected image projected on the projection surface 101. In other words, the projector 1 according to the embodiment has a structure in which the light source unit 60, the image forming unit 10, the illumination unit 20, the first optical unit 30, and the folding mirror 41 are arranged in directions in parallel with the plane of the projected image projected on the projection surface 101 (the Z direction or the Y direction in FIG. 15), and the light source unit 60, the image forming unit 10, the illumination unit 20, the first optical unit 30, and the folding mirror 41 are arranged in a manner intersecting with a plane that is in parallel with the projection surface and the image plane of projected image. Because the light source unit 60, the image forming unit 10, the illumination unit 20, the first optical unit 30, and the folding mirror 41 are arranged in the directions in parallel with the plane of the projected image projected on the projection surface 101 (the Z direction or the Y direction in FIG. 15), the length in the direction perpendicular to the projection surface 101 (in the X direction in FIG. 15) can be reduced, as illustrated in FIG. 15, compared with the projectors illustrated in FIGS. 16 and 17. In this manner, the projector 1 can be suppressed from taking up a space for chairs and tables, and the convenient projector 1 can be provided.

Furthermore, in the embodiment, the light source 61 and the power unit 80 for supplying power to the DMD 12 are provided above the light source unit 60, as illustrated in FIG. 14 explained earlier. In this manner, the Z direction of the projector 1 is also reduced.

In the embodiment, the second optical system includes the folding mirror 41 and the curved mirror 42. However, the second optical system may only have the curved mirror 42. Furthermore, the folding mirror 41 may be a plane mirror, a mirror with a positive refractive power, or a mirror with a negative refractive power. Furthermore, in the embodiment, a concave mirror is used for the curved mirror 42, but a convex mirror may be used instead. In such a case, the first optical system 70 is configured so that no intermediate image is formed between the first optical system 70 and the curved mirror 42.

The light source 61 needs to be replaced regularly because the light source reaches a lifetime due to aging. Therefore, in the embodiment, the light source unit 60 is provided removable from apparatus main unit.

Figure 18:
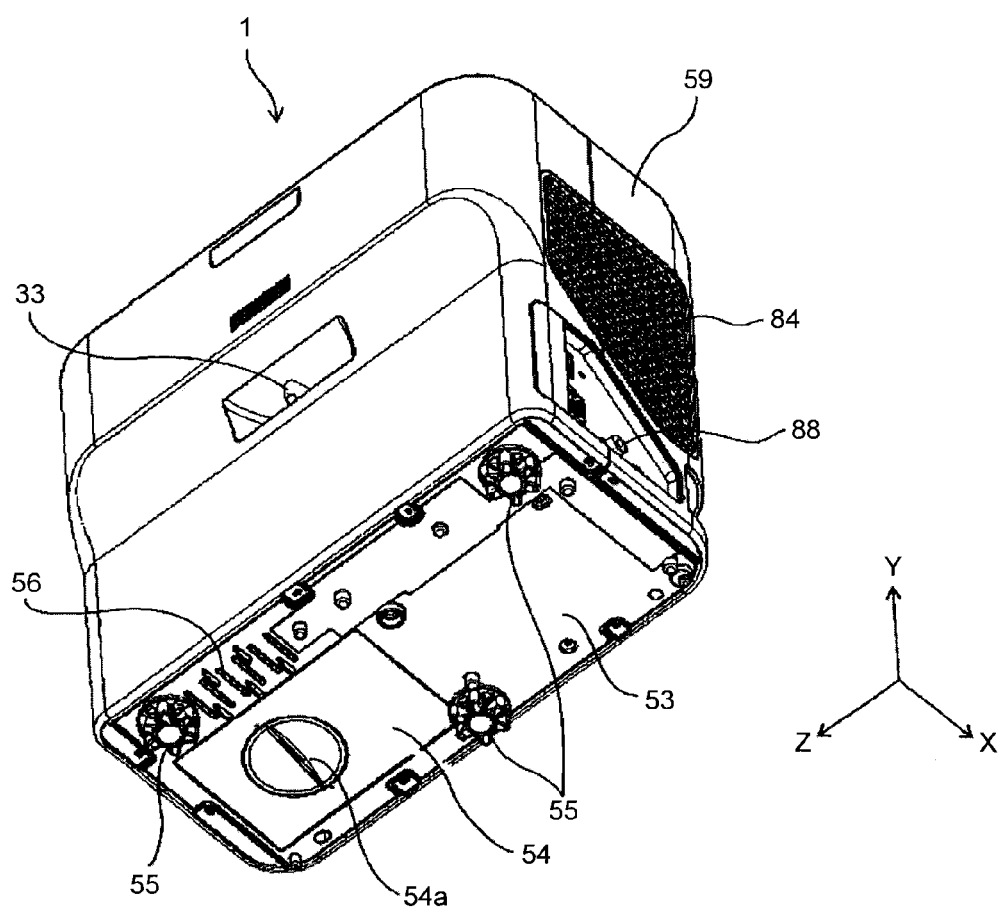
FIG. 18 is a perspective view of the projector seen from a setting surface side.

FIG. 18 is a perspective view of the projector 1 viewed from a setting surface.

As illustrated in FIG. 18, the base member 53 functioning as the bottom surface of the projector 1 is provided with the removable cover 54, and the removable cover 54 has a rotational knob 54a. When the rotational knob 54a is rotated, the removable cover 54 and apparatus main unit are disengaged, so that the removable cover 54 can be removed from the apparatus main unit. The base member 53 also has a power supply air inlet 56 at a position adjacent to the removable cover 54 in the X direction.

Provided on one Y-X plane of the outer cover 59 of the projector 1 is an air inlet 84 and an external input unit 88 for receiving image data or the like from an external apparatus such as a personal computer, as illustrated in FIG. 18.

Figure 19:
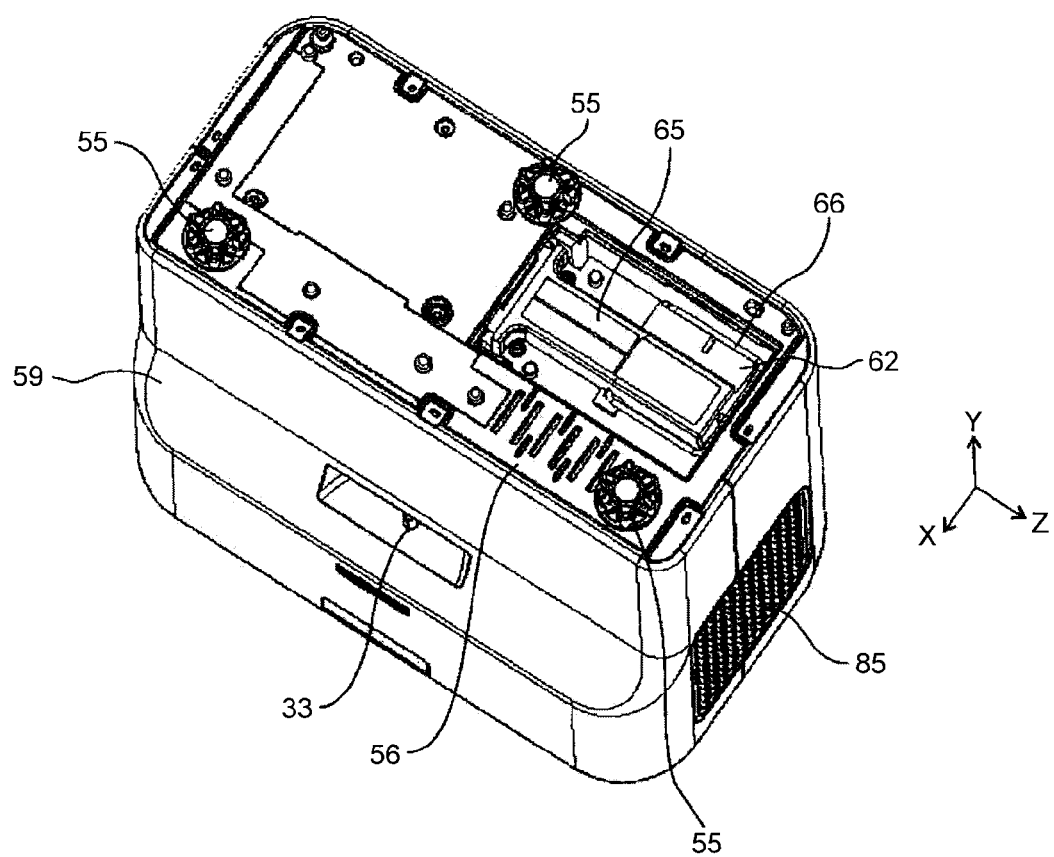
FIG. 19 is a perspective view illustrating the apparatus with the removable cover removed.

FIG. 19 is a perspective view illustrating the apparatus with the removable cover 54 removed.

When the removable cover 54 is removed, a surface of the light source bracket 62 in the light source unit 60 on the opposite side of the surface on which the light source 61 is mounted is exposed, as illustrated in FIG. 19. The light source bracket 62 includes a handle 66 that is rotatable with respect to the light source bracket 62 about a rotating axis at a line 01 illustrated in a dotted line in FIG. 19.

When the light source unit 60 is to be removed from the apparatus main unit, the handle 66 is rotated, and the light source unit 60 is pulled out toward the front side in FIG. 19, by grabbing the handle 66. In this manner, the light source unit 60 is removed through the opening on the apparatus main unit. When the light source unit 60 is to be mounted on the apparatus main unit, the light source unit 60 is inserted into the opening on the apparatus main unit. As the light source unit 60 is inserted into the apparatus main unit, the connector 62a illustrated in FIG. 4 explained earlier becomes connected with the power-supply side connector not illustrated on the apparatus main unit, and the three light source aligning portions 64a1 to 64a3 on the holder 64 illustrated in FIG. 4 become engaged with the respective three light source portions-to-be-aligned 26a1 to 26a3 provided on the illumination bracket 26 in the illumination unit 20 illustrated in FIG. 6 mentioned above, and the light source unit 60 becomes aligned with respect to the apparatus main unit. In this manner, mounting of the light source unit 60 is completed. The removable cover 54 is then attached to the base member 53. In the embodiment, the light source unit 60 includes the handle 66, but the passage 65 provided in a manner protruding toward the removable cover 54, as illustrated in FIG. 19, may be used as a handle.

The base member 53 includes three feet 55 provided thereto. By rotating each of the feet 55, the amount by which the foot 55 protrudes from the base member 53 can be changed, to enable the height direction (the Y direction) to be adjusted.

On the other Y-X plane of the outer cover 59, an air outlet 85 is provided, as illustrated in FIG. 19.

Figure 20:
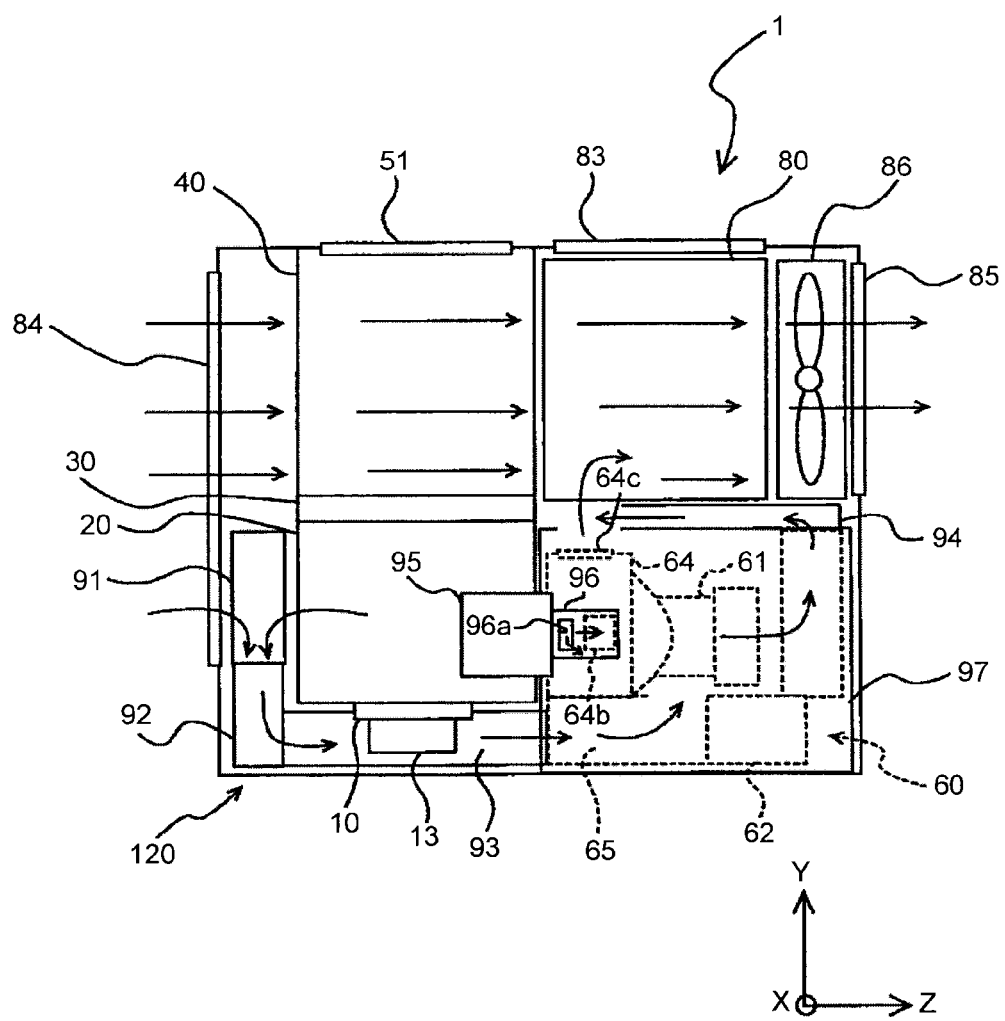
FIG. 20 is a schematic explaining how the air flows inside of the projector.
Figure 21:
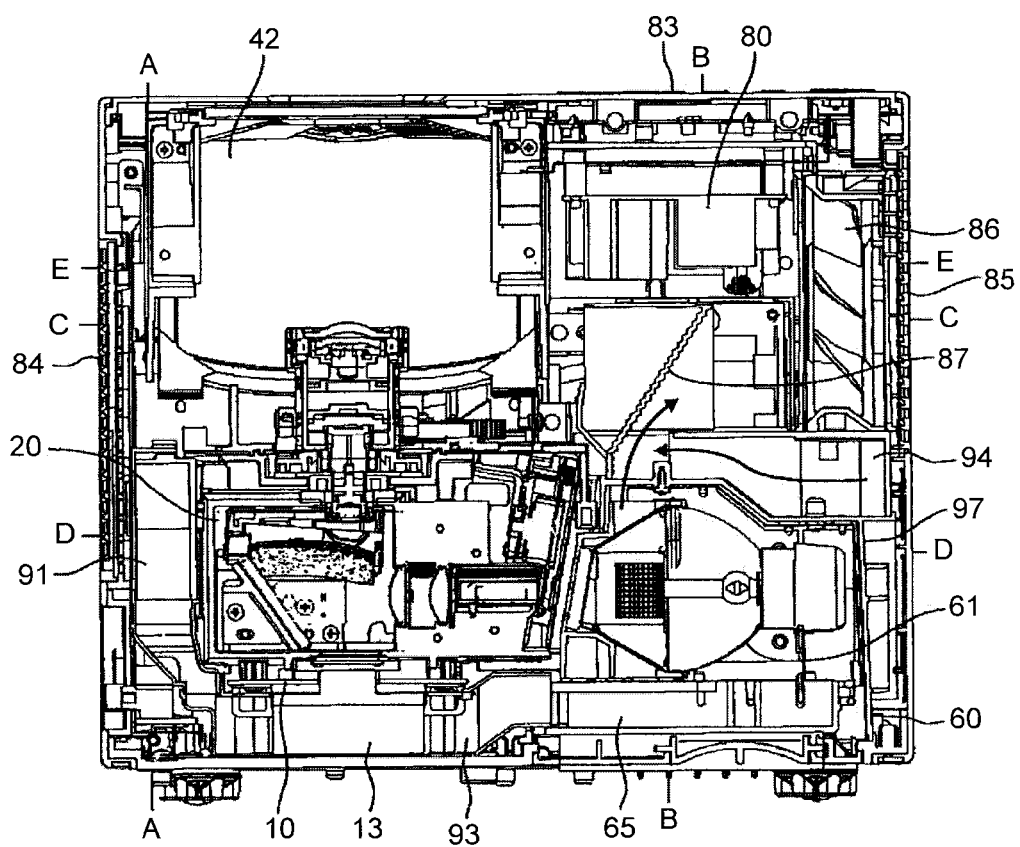
FIG. 21 is a schematic illustrating the structures illustrated in FIG. 20 more specifically.
Figure 22:
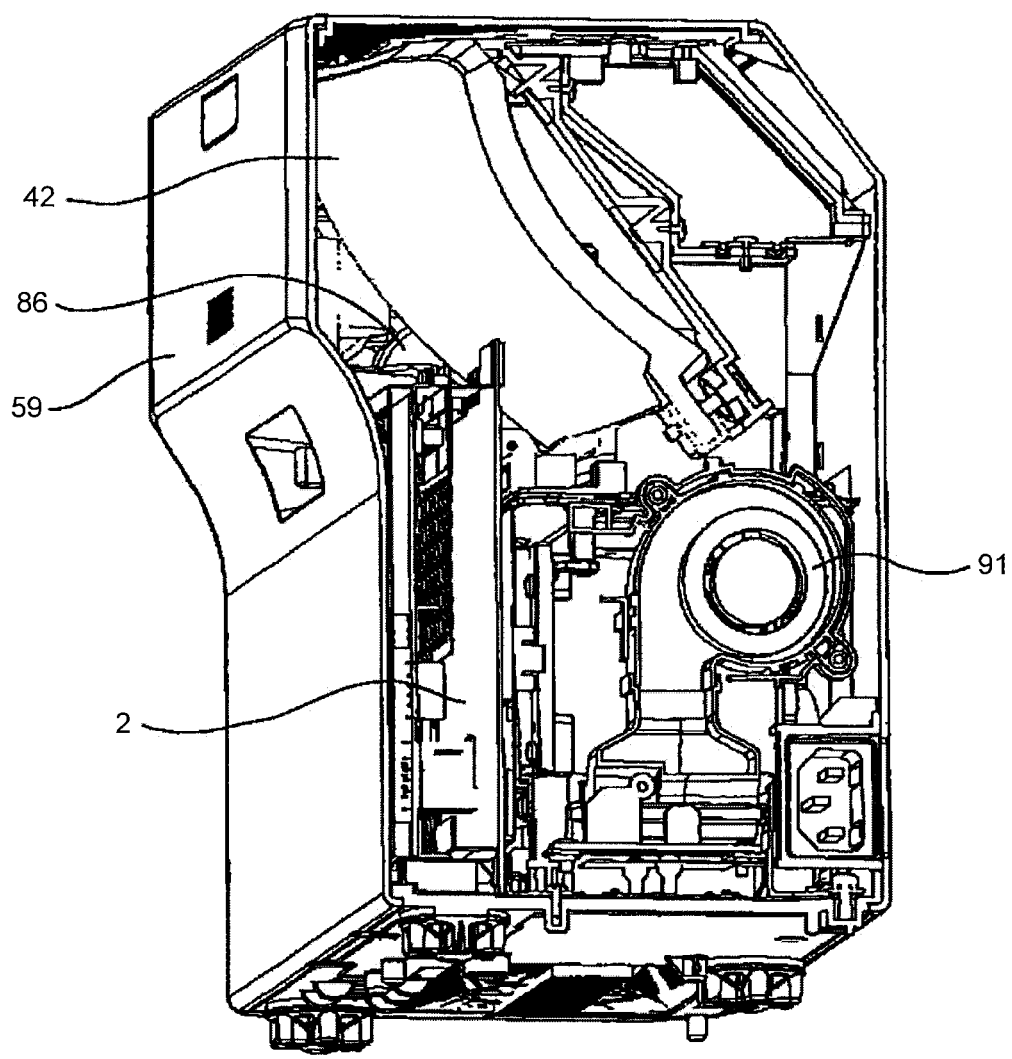
FIG. 22 is a cross-sectional view across A-A in FIG. 21.
Figure 23:
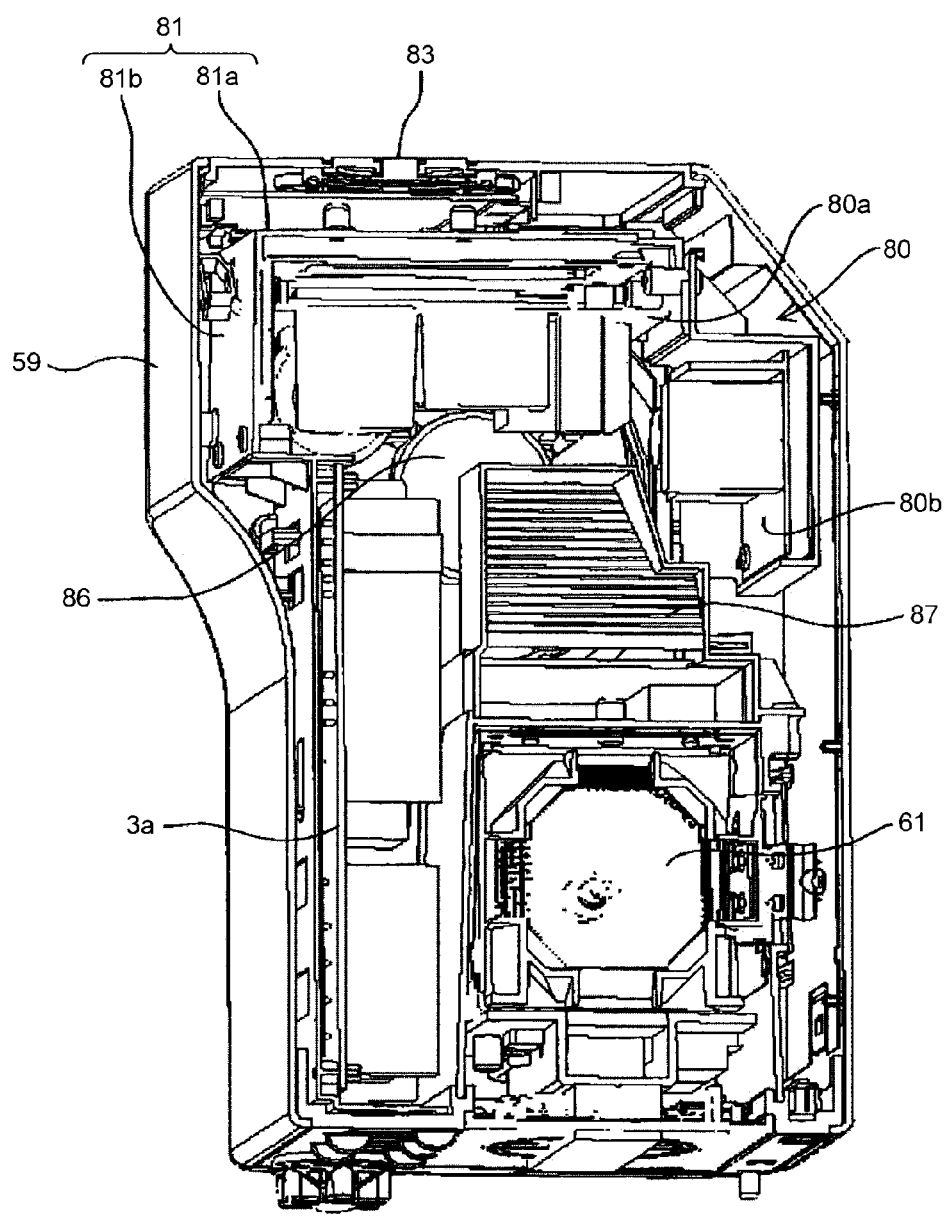
FIG. 23 is a cross-sectional view across B-B in FIG. 21.
Figure 24:
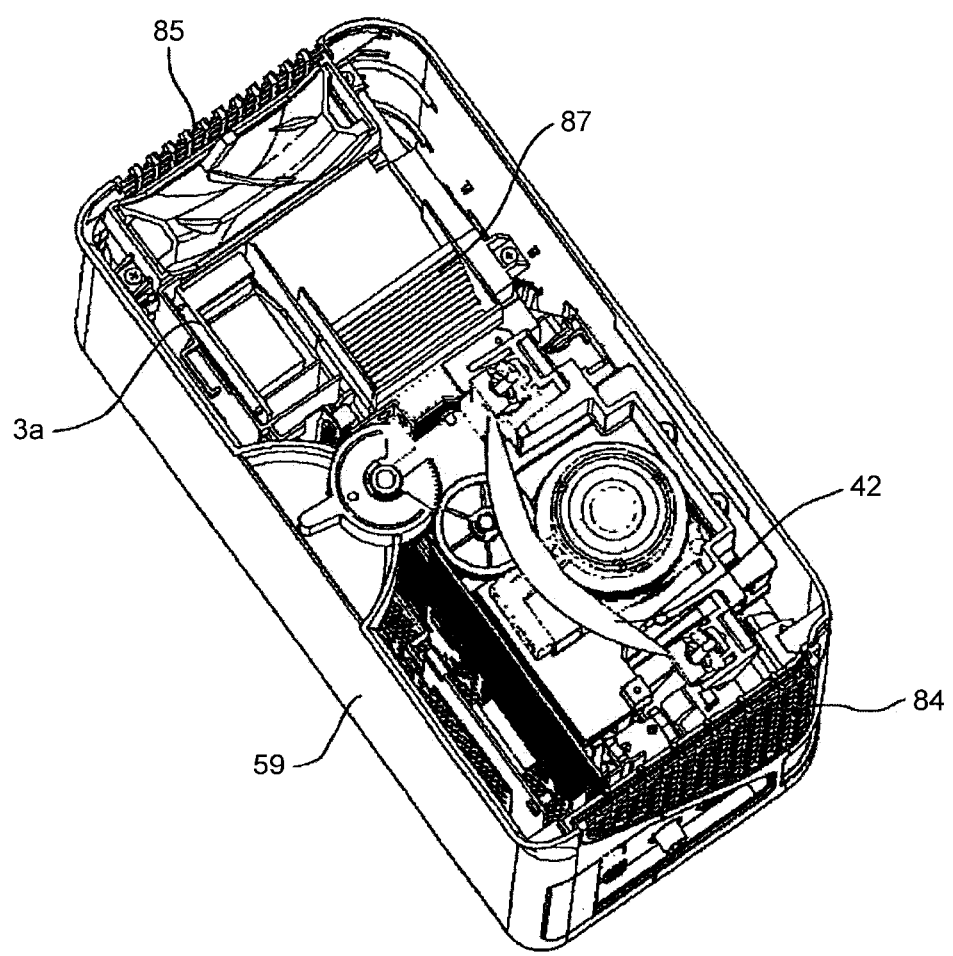
FIG. 24 is a cross-sectional view across C-C in FIG. 21.
Figure 25:
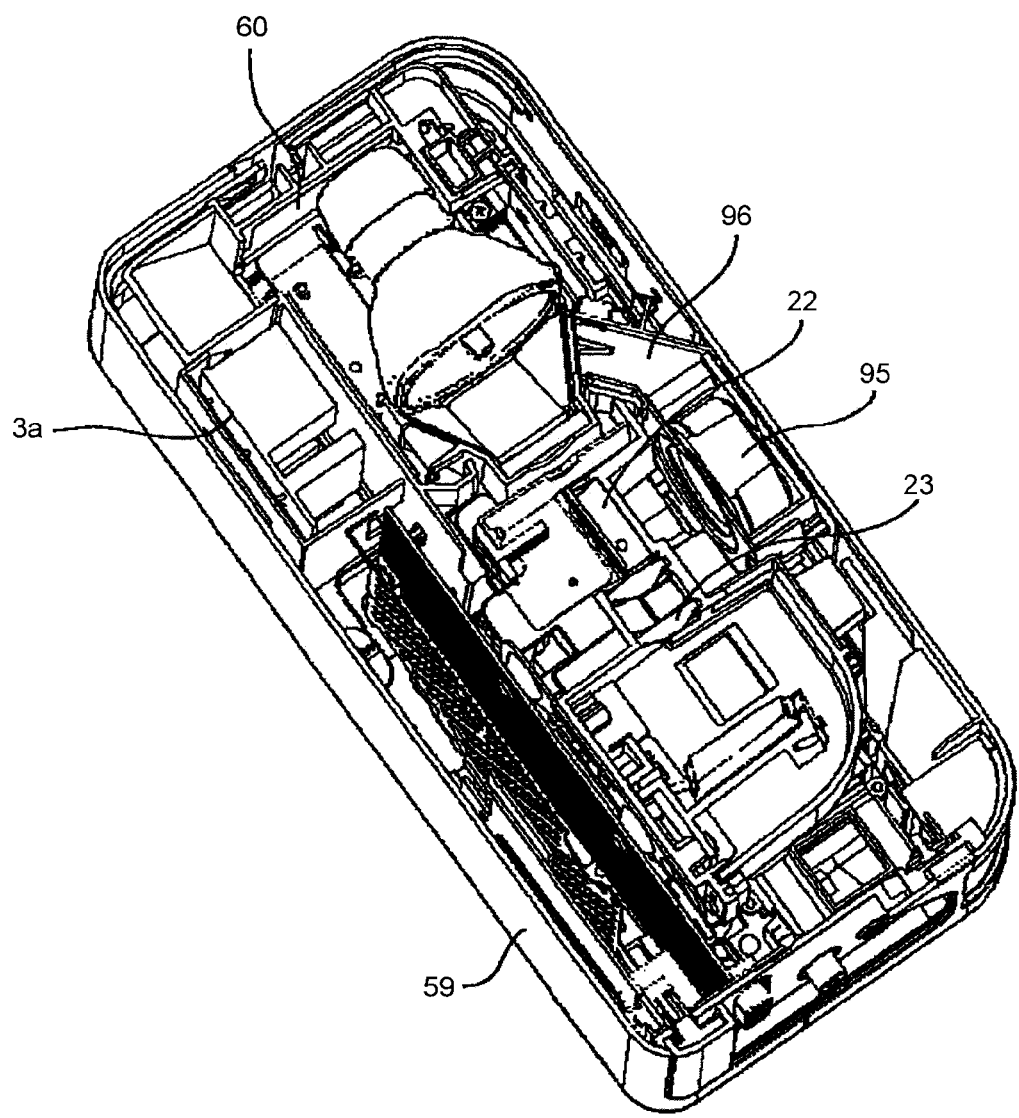
FIG. 25 is a cross-sectional view across D-D in FIG. 21.
Figure 26:
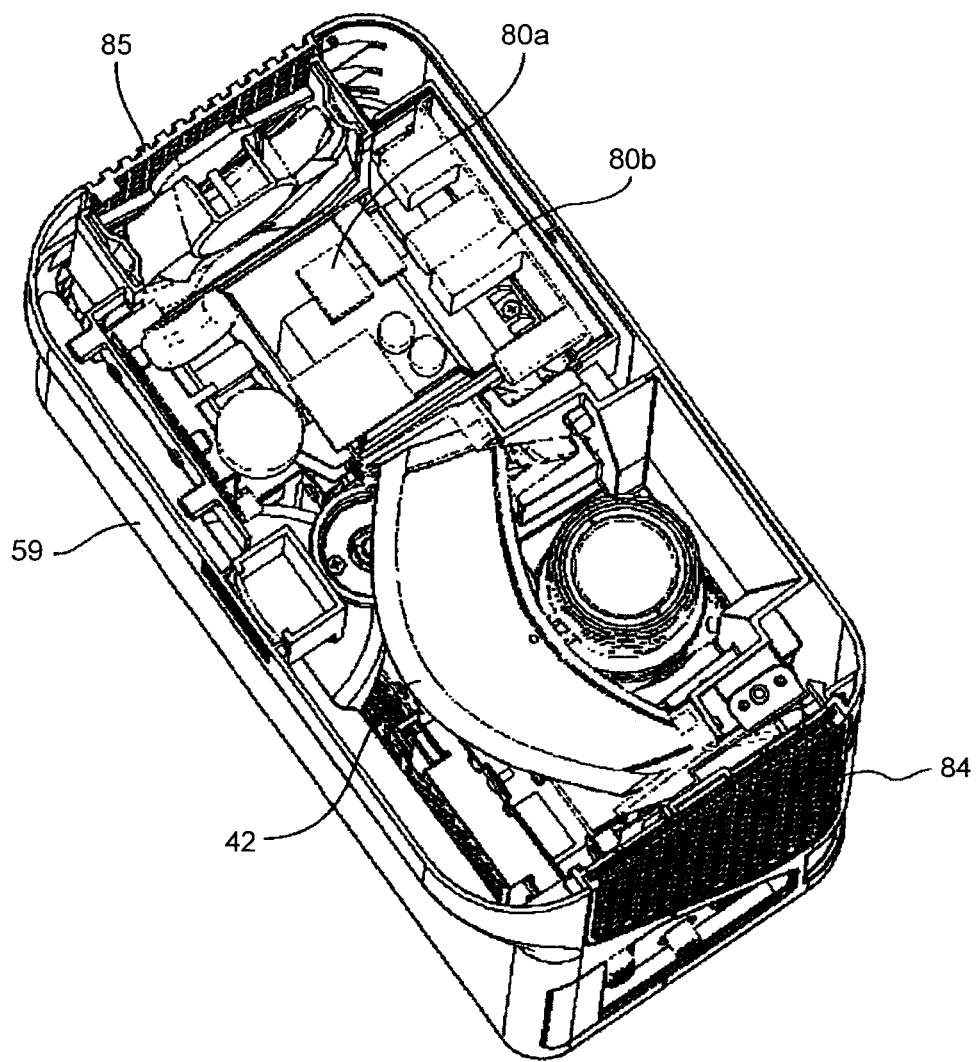
FIG. 26 is a cross-sectional view across E-E in FIG. 21.

FIG. 20 is a schematic for explaining how the air flows inside of the projector 1 according to the embodiment. FIG. 20 is a schematic of the projector 1 viewed from a direction perpendicular to the projection surface 101 (from the X direction). Arrows illustrated in FIGS. 20 and 21 indicate directions in which the air flows. FIG. 22 is a sectional view of FIG. 21 across A-A. FIG. 23 is a sectional view of FIG. 21 across B-B. In FIGS. 21, 22, and 23, the reference numerals indicated in FIG. 20 are assigned to the corresponding structures.

As illustrated in FIG. 20, provided on one side surface of the projector 1 (on the left side in FIG. 20) is the air inlet 84 opened so that the external air can be collected into the projector 1. Provided on the other side surface of the projector 1 (on the right side in FIG. 20) is the air outlet 85 opened so as to allow the air inside of the projector 1 to be discharged. A discharge fan 86 is provided facing the air outlet 85.

The air outlet 85 and the air inlet 84 are arranged so that some part of the air outlet 85 and the air inlet 84 comes between the light source unit 60 and the operating unit 83, viewing the projector 1 from the direction perpendicular to the projection surface 101 (the X direction). A space is kept between the rear surface of the curved mirror 42 and the outer cover 59 facing the rear surface, so that the air can flow through the space. In this manner, the external air collected through the air inlet 84 flows around the ZY plane of the mirror holder 45 in the second optical unit 40 illustrated in FIG. 12 mentioned earlier, and around the rear surface of the curved mirror 42. The air then moves toward the air outlet 85 in a manner following the mirror holder 45 and the curved rear surface of the curved mirror 42. Therefore, a relatively large channel for the air can be ensured within a compact projector. As explained earlier, the curved mirror 42 is a concave mirror with a positive power, and the rear surface of the curved mirror 42 has a convex form generally following the form of the front surface. Therefore, the air suctioned into the air inlet 84 can pass along the rear surface of the curved mirror without having the speed reduced. The power unit 80 provided above the light source unit 60 has a general rectangular U shape not having a side only on the side of the light source unit 60, viewing from the Z direction in FIG. 20 (see FIG. 22). Therefore, the external air collected through the air inlet 84 and moving toward the air outlet 85 following the mirror holder 45 or the curved rear surface of the curved mirror 42 flows into a space in the power unit 80 having three sides surrounded out of the four sides, excluding the side on the side of the light source unit 60, and is discharged through the air outlet 85.

Figure 34:
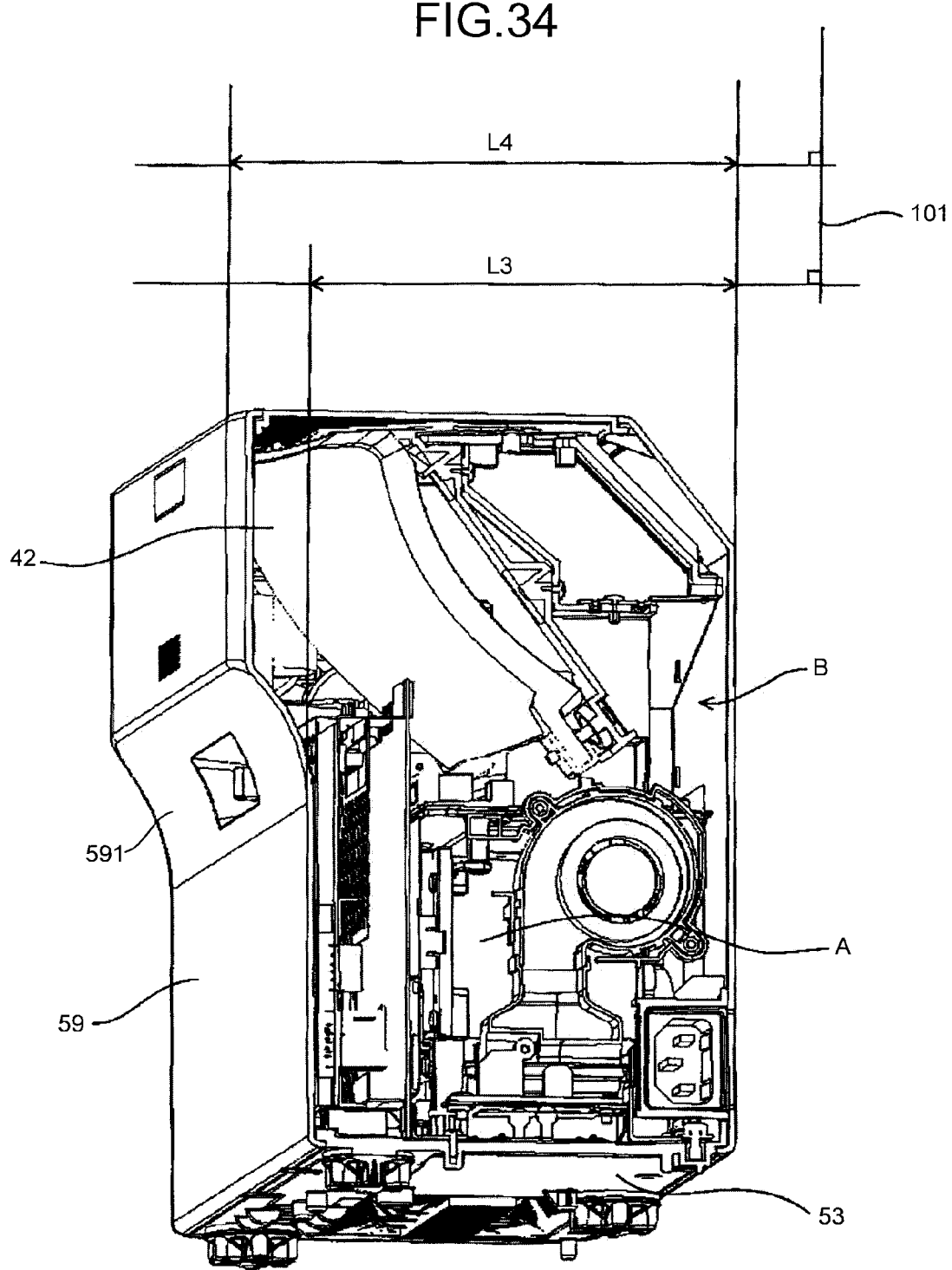
FIG. 34 is a schematic illustrating a relation of sizes of a part of the outer cover facing the projecting optical unit and a part of the outer cover facing the image forming unit, in the direction perpendicular to a projection surface.

In the manner described above, because the air outlet 85 and the air inlet 84 are arranged so that some part of the air outlet 85 and the air inlet 84 comes between the light source unit 60 and the operating unit 83, viewing the projector 1 from the direction perpendicular to the projection surface 101 (the X direction), an air flow passing between the light source unit 60 and the operating unit 83 and discharged through the air outlet 85 can be generated. Furthermore, as explained earlier, the air suctioned through the air inlet 84 passes along the rear surface of the curved mirror 42 and reaches the air outlet 85. This is because a space for allowing the air to flow through, that is a channel, is formed between the rear surface of the curved mirror 42 and an internal wall of the outer cover 59, as illustrated in FIG. 22. By providing the channel from the air inlet 84 to the air outlet 85 along the rear surface of the curved mirror 42, reduction of the speed of the airflow suctioned through the air inlet 84 can be suppressed. Furthermore, a part of the surface of the outer cover 59 on a side of the projector 1 opposite to a side of the projector 1 that faces the projection surface 101, where the curved mirror 42 is disposed, protrudes relative to another part of the outer cover 59, in the same manner as the curved mirror 42, away from the projection surface 101, as illustrated in FIG. 34. In other words, the width of the enclosure of the projector 1 on the side of the projector 1 opposite to the side of the projector 1 that faces the projection surface 101 is larger at a position and at a height where the projecting optical unit B is provided in the direction perpendicular to the projection surface 101 than the width at a position and at a height where the base member 53 or the image forming unit A is provided. Therefore, in an area of a surface of the outer cover 59 on the side of the projector 1 opposite to the side of the projector 1 that faces the projection surface 101, an area between an upper end and a lower end of the curved mirror 42 protrudes in a direction toward the side of the projector 1 opposite to the side of the projector 1 that faces the projection surface 101. By giving such a shape to the outer cover 59, fingers can be better hooked onto the outer cover 59, and the installation footprint can be reduced as well.

A light source blower 95 is disposed at a position allowing the air to be suctioned around the color motor 21a driving the color wheel 21 in the illumination unit 20 (see FIG. 5) in rotation. In this manner, the color motor 21a and the light tunnel 22 can be cooled with the airflow generated by the suctioning of the air by the light source blower 95.

The air suctioned by the light source blower 95 passes through a light source duct 96, and flows into the light source air inlets 64b on the holder 64 (see FIG. 4). Part of the air flowing into the light source duct 96 flows between a light source housing 97 and the outer cover 59 via an opening 96a formed on a surface of the light source duct 96 facing the outer cover 59 (see FIG. 19).

The air flowing through the opening 96a on the light source duct 96 between the light source housing 97 and the outer cover 59 cools the light source housing 97 and the outer cover 59, and then is discharged from the air outlet 85 by the discharge fan 86.

The air collected through the light source air inlets 64b flows into the light source 61, cools the light source 61, and is discharged from the light source air outlet 64c provided on the top surface of the holder 64. The air discharged from the light source air outlet 64c flows from an opening on the top surface of the light source housing 97 toward the air outlet 85, following a fluid guide 87. The air then flows around the second optical unit 40, becomes mixed with the low-temperature air coming into the surrounded space in the power unit 80, and is discharged from the air outlet 85 by the discharge fan 86. In the manner described above, because the high-temperature air discharged from the light source air outlet 64c is mixed with the external air before being discharged, the air discharged from the air outlet 85 can be suppressed from being highly heated.

It is preferable for the operating unit 83 where a user makes operations to be provided on the top surface of the apparatus so that the user can make the operations easily. However, in the embodiment, because the transmissive glass 51 through which an image is projected on the projection surface 101 is provided on the top surface of the projector 1, the operating unit 83 needs to be provided at a position above the light source 61, viewing the projector from the Y direction.

In the embodiment, because the light source 61 is cooled by the airflow flowing from the air inlet 84 to the air outlet 85 between the light source unit 60 and the operating unit 83, and the heated air is discharged toward the air outlet, the heated air can be suppressed from moving toward the operating unit 83. In this manner, the operating unit 83 can be suppressed from being heated by the air heated by having cooled the light source 61. Furthermore, part of the air flowing from the air inlet 84 around the second optical unit 40 toward the air outlet 85 passes directly below the operating unit 83, so that the operating unit 83 is cooled. This also suppresses the operating unit 83 from being heated.

The discharge fan 86 suctions the external air through the power supply air inlet 56 provided on the base member 53 illustrated in FIG. 18 mentioned earlier. A ballast board 3a for supplying a stable power (current) to the light source 61 is provided behind the light source housing 97 in the X direction in FIG. 20. The external air suctioned through the power supply air inlet 56 moves upwardly between the light source housing 97 and the ballast board 3a, cooling the ballast board 3a. The air then flows into the surrounded space in the power unit 80 provided above the ballast board, and the air is discharged by the discharge fan 86 through the air outlet 85.

In the embodiment, because the fan for generating an airflow moving from the air inlet 84 to the air outlet 85 is provided as the discharge fan 86 on the side where the air is discharged, the amount of air supplied into the apparatus through the air inlet can be increased compared with when the fan is provided at the air inlet. This is because, if the fan is provided at the air inlet 84, the second optical unit 40 would be provided in a direction to which the air from the fan is sent, and the second optical unit 40 would reduce the amount of the external air supplied by the fan into the apparatus. By contrast, when the fan is provided as the discharge fan 86 on the side of the air outlet 85, because generally no object is provided on the side of the air outlet 85 where the air is discharged, the amount of the air discharged by the discharge fan 86 is not reduced. Because the same amount of air discharged by the discharge fan 86 is collected through the air inlet 84, the resultant amount of air supplied through the air inlet into the apparatus is not reduced. Therefore, the air can be sent from the air inlet 84 to the air outlet 85 at a given pressure, and the heated air rising from the light source 61 can be carried toward the air outlet 85 via the airflow from the air inlet 84 to the air outlet 85.

On the lower left side of the apparatus main unit in FIG. 20, the heat sink 13 in the image forming unit 10 and a cooler 120 for cooling the light source unit 60 and the light source bracket 62 are provided. The cooler 120 includes the suction blower 91, a vertical duct 92, and a horizontal duct 93.

The suction blower 91 is provided facing a lower part of the air inlet 84, and suctions the external air through the air inlet 84 from a surface facing the air inlet 84, as well as the air inside of the apparatus from a surface on the opposite side of the surface facing the air inlet. The external air then flows into the vertical duct 92 provided below the suction blower 91. The air flowing into the vertical duct 92 moves downwardly, and sent into the horizontal duct 93 connected to the lower part of the vertical duct 92.

The heat sink 13 is provided inside of the horizontal duct 93, and cooled by the air flowing through the horizontal duct 93. By cooling the heat sink 13, the DMD 12 can be cooled efficiently so that the DMD 12 can be suppressed from being heated.

The air moving through the horizontal duct 93 flows into the duct 65 or the opening 65a provided to the light source bracket 62 in the light source unit 60 illustrated in FIG. 4 mentioned earlier. The air flowing into the opening 65a further flows between the removable cover 54 and the light source bracket 62, to cool the removable cover 54.

The air flowing into the duct 65 cools the light source bracket 62, and then flows into a part of the light source 61 on the opposite side of the light output. After cooling that part, the air passes through a discharge duct 94, and is discharged by the discharge fan 86 through the air outlet 85. The air passing through the opening 65a and flowing between the removable cover 54 and the light source bracket 62 cools the removable cover 54, moves inside of the apparatus, and is discharged by the discharge fan 86 through the air outlet 85.

By providing the duct 65 to the light source bracket 62 and cooling the light source bracket 62, the light source 61 can be suppressed from being heated. Therefore, the light source 61 can be cooled well even when the flow rate of the cooling air flowing into the light source 61 is reduced. In this manner, the revolutions per minute of the light source blower 95 can be reduced, so that the blowing noise of the light source blower 95 can be suppressed. Furthermore, because the revolutions per minute of the light source blower 95 can be reduced, power saving can be achieved in the apparatus.

Figure 27:
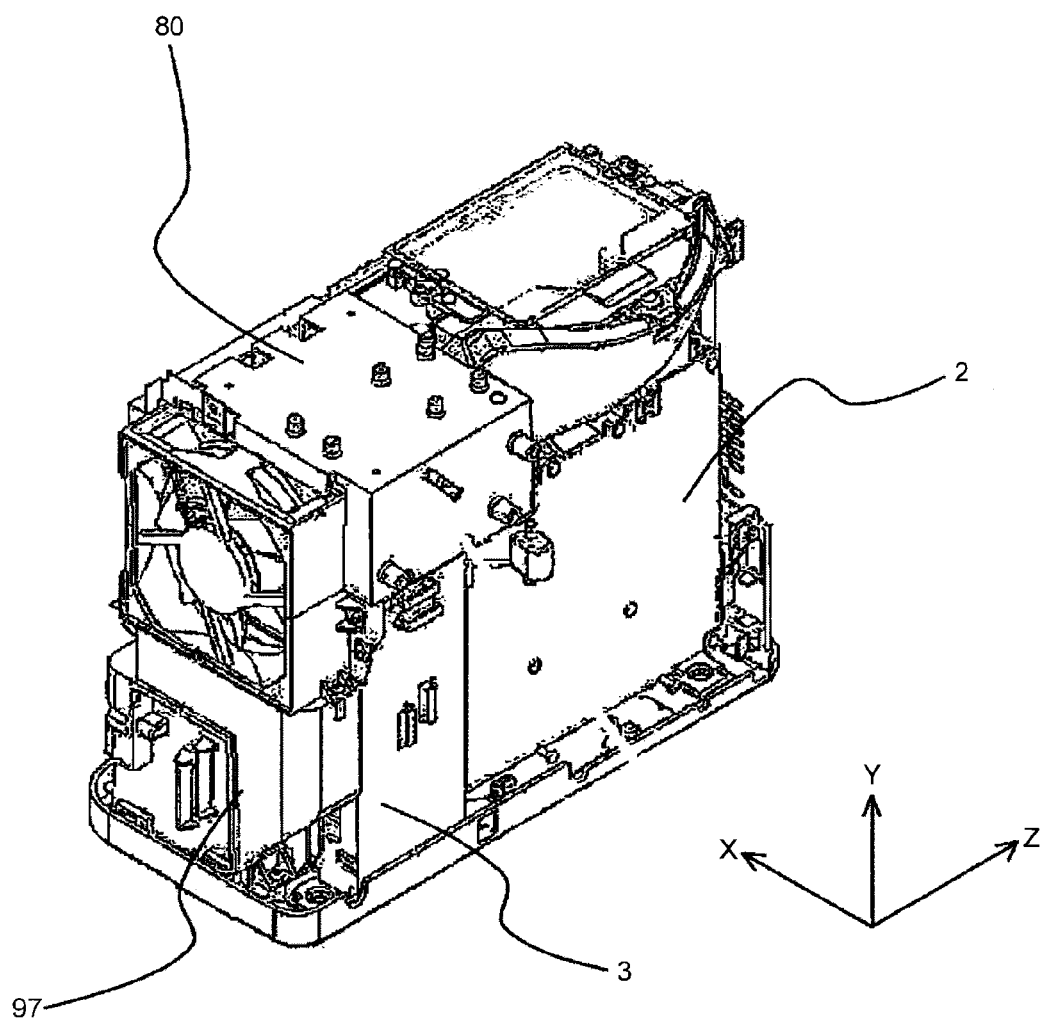
FIG. 27 is a perspective view illustrating boards installed in the apparatus main unit.

FIG. 27 is a perspective view illustrating boards installed in the apparatus main unit.

As illustrated in FIG. 27, the projector 1 according to the embodiment includes a control board 2 being a controller for controlling driving of the DMD 12 that is an image forming element, for example, a ballast board unit 3 having the ballast board 3*a* (see FIG. 30) being a power stabilizer for supplying a stable power (current, voltage) to the light source 61, and the power unit 80 having a power factor correction (PFC) power board being a power board for boosting an alternating current voltage supplied by a power cable not illustrated and supplying the voltage to the control board 2 and the ballast board 3*a*.

Figure 28:
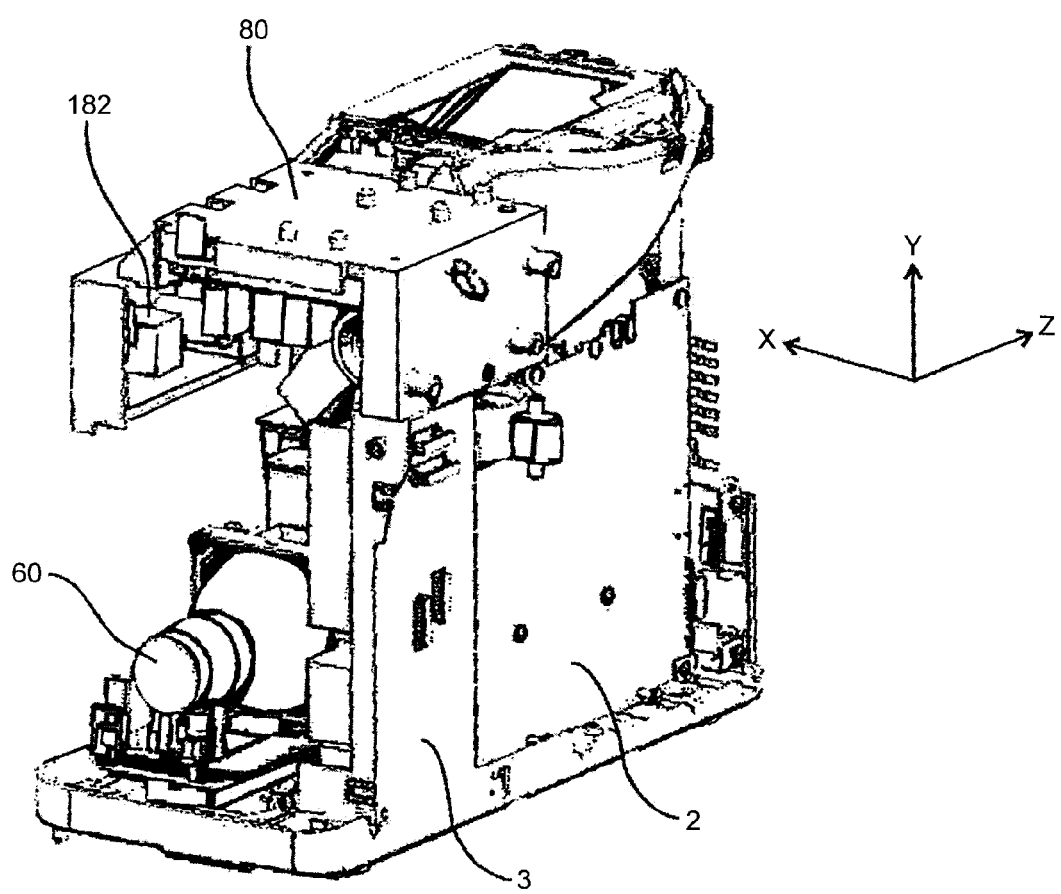
FIG. 28 a perspective view with a discharge fan and a light source housing removed from FIG. 27.

FIG. 28 is a perspective view with the discharge fan 86 and the light source housing 97 removed from FIG. 27.

As illustrated in FIG. 28, the control board 2 is provided facing the side surface (ZY plane) of the illumination unit 20 and the first optical unit 30. The ballast board unit 3 is provided adjacent to the control board 2 in the Z direction (horizontal direction), and adjacent to the light source unit 60 in the X direction (in the direction perpendicular to the projected image). The power unit 80 is provided above the light source unit 60 and the ballast board unit 3. The power unit 80 also includes a thermal switch 182 that shuts down the voltage supply from the power cable not illustrated when the temperature of the power unit reaches a predetermined level.

Figure 29:
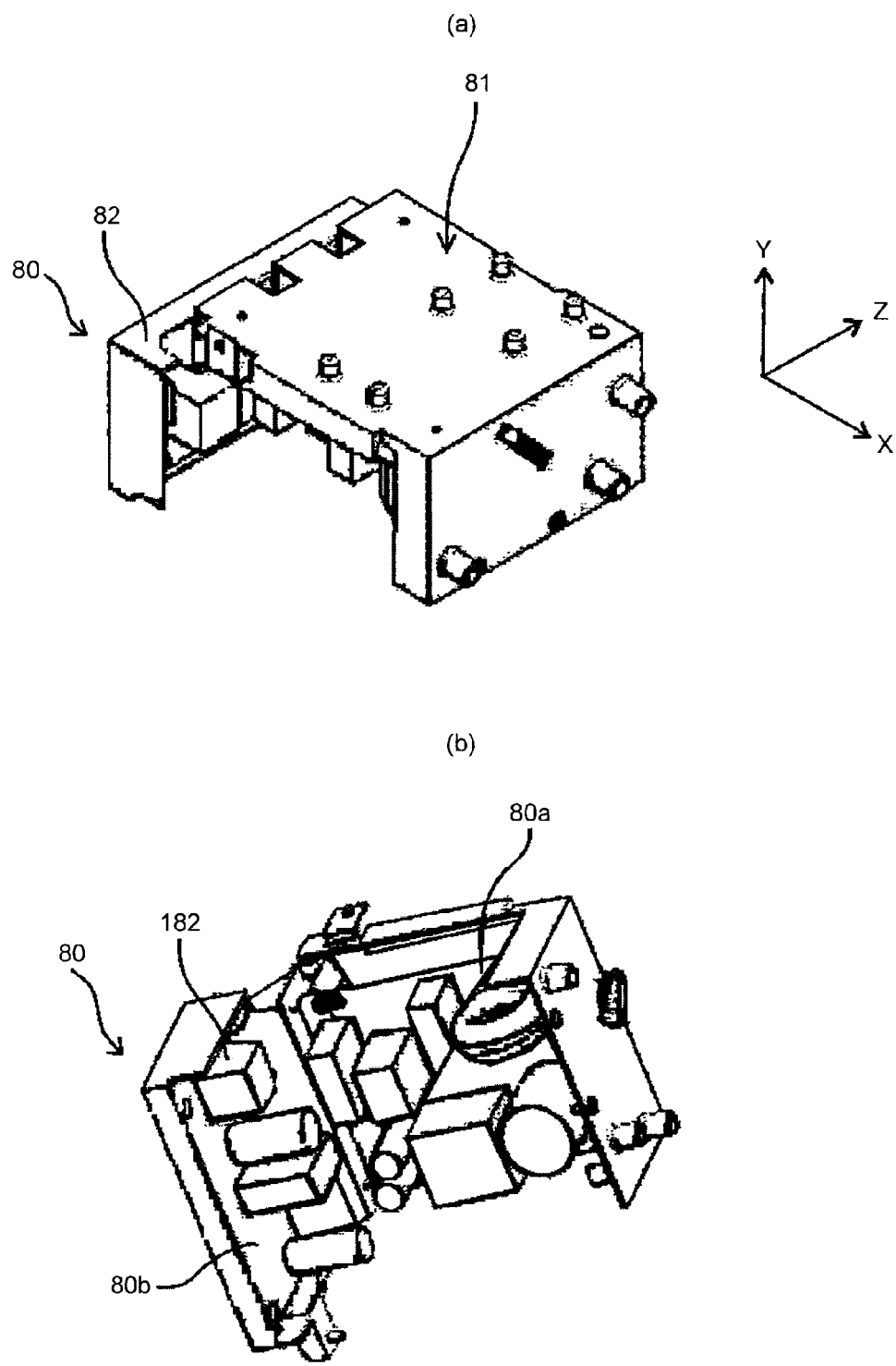
FIG. 29 is a perspective view illustrating a power unit.

FIG. 29 is a perspective view illustrating the power unit 80.

As illustrated in FIGS. 23, the PFC power board in the power unit 80 is divided into a main PFC power board 80*a* being a first power board and a sub-PFC power board 80*b* being a second power board. The main PFC power board 80*a* is mounted on a general L-shaped main board holder 81, and the sub-PFC power board 80*b* is mounted on a sub-board holder 82.

The main board holder 81 includes a board mounting surface 81*a* on which the main PFC power board 80*a* is mounted on the bottom surface and a covering surface 81*b* extending downwardly from a front end of the board mounting surface 81*a* in the X direction in (a) in FIG. 29.

The sub-board holder 82 is mounted on the front end of the board mounting surface 81*a* in the X direction in (a) in FIG. 29, so that the sub-PFC power board 80*b* faces the covering surface 81*b*. The thermal switch 182 is implemented on the sub-PFC power board 80*b*. As illustrated in FIG. 21 mentioned earlier, the power unit 80 is mounted on the apparatus main unit so that the air inlet through which the discharge fan 86 collects the air is surrounded by the board mounting surface 81*a* and the covering surface 80*b* of the main board holder 81, and the sub-board holder 82.

In the manner described above, the main PFC power board 80*a*, the sub-PFC power board 80*b*, and the covering surface 81*b* are arranged in a manner surrounding the channel of the air moving toward the discharge fan 86 by being suctioned by the discharge fan 86 being a blower. More specifically, the main PFC power board 80*a* and the sub-PFC power board 80*b* are arranged so as to extend along two sides of a general rectangle, viewing from the side of the end surfaces of the board. Among the four sides of the general rectangle, neither one of the main PFC power board 80*a* and the sub-PFC power board 80*b* is arranged on the side closest to the light source unit 60 so that the air flowing from the light source unit 60 toward the air outlet 85 is not obstructed. Furthermore, among the sides of the general rectangle, because neither one of the main PFC power board 80*a* and the sub-PFC power board 80*b* is arranged on the side closest to the outer cover on the opposite side of the projection surface, the airflow moving toward the air outlet 85 along the concaved rear surface of the curved mirror is not obstructed. Therefore, the speed of the airflow moving toward the air outlet 85 along the concaved rear surface of the curved mirror is not reduced. Arranging neither one of the main PFC power board 80*a* and the sub-PFC power board 80*b* on the side closest to the outer cover on the opposite side of the projection surface, among the sides of the general rectangle, means the same thing as arranging neither one of the main PFC power board 80*a* and the sub-PFC power board 80*b* on the covering surface 81*b* of the power unit 80. The curved mirror 42 is a concave mirror with a positive power as mentioned earlier, and the rear surface of the curved mirror 42 has a convex form generally following the form of the front surface. The air collected through the air inlet 84 provided on the side surface of the outer cover 59 and moving toward the air outlet 85 passes through the space surrounded by the sub-PFC power board 80*b*, the main PFC power board 80*a*, and the covering surface 81*b*, and is discharged by the discharge fan 86 through the air outlet 85. In this manner, as the main PFC power board 80*a* and the sub-PFC power board 80*b* are heated by the light source unit 60 and the fluid guide 87, the main PFC power board 80*a* and the sub-PFC power board 80*b* can be cooled by the air flow flowing into the discharge fan 86.

If the main PFC power board 80*a* and the sub-PFC power board 80*b* are arranged side by side in the direction of the air flow, the PFC power board provided downstream in the airflow is cooled by the air heated by the PFC power board located on the upstream side. Therefore, the PFC power board on the downstream is not sufficiently cooled. By contrast, when the main PFC power board 80*a* and the sub-PFC power board 80*b* are arranged in a manner surrounding the airflow collected through the air inlet 84 and moving toward the air outlet 85 in the manner disclosed in the embodiment, the main PFC power board 80*a* and the sub-PFC power board 80*b* are allowed to be cooled by the air at a lower temperature. In this manner, even at a location affected by the heated air discharged from the light source unit 60, the main PFC power board 80*a* and the sub-PFC power board 80*b*, that is, the overall PFC power boards can be cooled well.

The air inlet through which the discharge fan 86 suctions the air is surrounded by a surface of the main PFC power board 80*a* on which electrical elements such as a coil, a capacitor, and a resistor are implemented, a surface of the sub-PFC power board 80*b* on which electrical elements are implemented, and the covering surface 81*b*. In this manner, the air collected through the air inlet 84 is allowed to hit the electrical elements such as a coil or a capacitor that are heated, so that the PFC power boards can be cooled efficiently.

Furthermore, in the embodiment, because the sub-PFC power board 80*b* is arranged in a positional relation in such a way that the surface of the sub-PFC power board 80*b* is laid perpendicular to the surface of the main PFC power board 80*a*, the apparatus can be reduced in size, compared with when the main PFC power board 80*a* and the sub-PFC power board 80*b* are arranged side by side in a manner so that the surface of the main PFC power board 80*a* is in parallel with the surface of the sub-PFC power board.

In the explanation above, the power unit 80 has a configuration in which the sub-PFC power board is arranged facing the covering surface 81*b*. It could be considered to attach the sub-board holder 82 to the lower end of the covering surface 80b, for example, to achieve a positional relation in which the sub-PFC power board 80b and the main PFC power board 80a face each other. In such a configuration as well, the channel for the air can be surrounded by the main PFC power board 80a and the sub-PFC power board 80b, so that the entire PFC power can be cooled well. Implemented on the main PFC power board 80a and the sub-PFC power board 80b are many electrical elements such as a coil long in a direction perpendicular to the board surface. Therefore, when the sub-PFC power board is provided in a manner facing the main PFC power board 80a, the electrical elements on the main PFC power board 80a and the electrical elements on the sub-PFC power board 80b would be arranged in a manner coming on top of each other in the direction of the airflow moving toward the discharge fan 86. As a result, the air flowing toward the discharge fan 86 hits the electrical elements, and the airflow in the space surrounded by the main PFC power board 80a, the sub-PFC power board 80b, and the covering surface 81b might be obstructed. By contrast, when the sub-PFC power board 80b is provided perpendicularly to the main PFC power board, at least the air flowing below the covering surface 81b within the space surrounded by the main PFC power board 80a, the sub-PFC power board 80b, and the covering surface 81b (on a side away from the main PFC power board 80a) can flow toward the discharge fan 86 without being obstructed by the electrical elements. In this manner, compared with when the sub-PFC power board 80b is arranged in a manner facing the main PFC power board 80a, the air flowing through the space surrounded by the main PFC power board 80a, the sub-PFC power board 80b, and the covering surface 81b, cooling can be performed efficiently.

Figure 30:
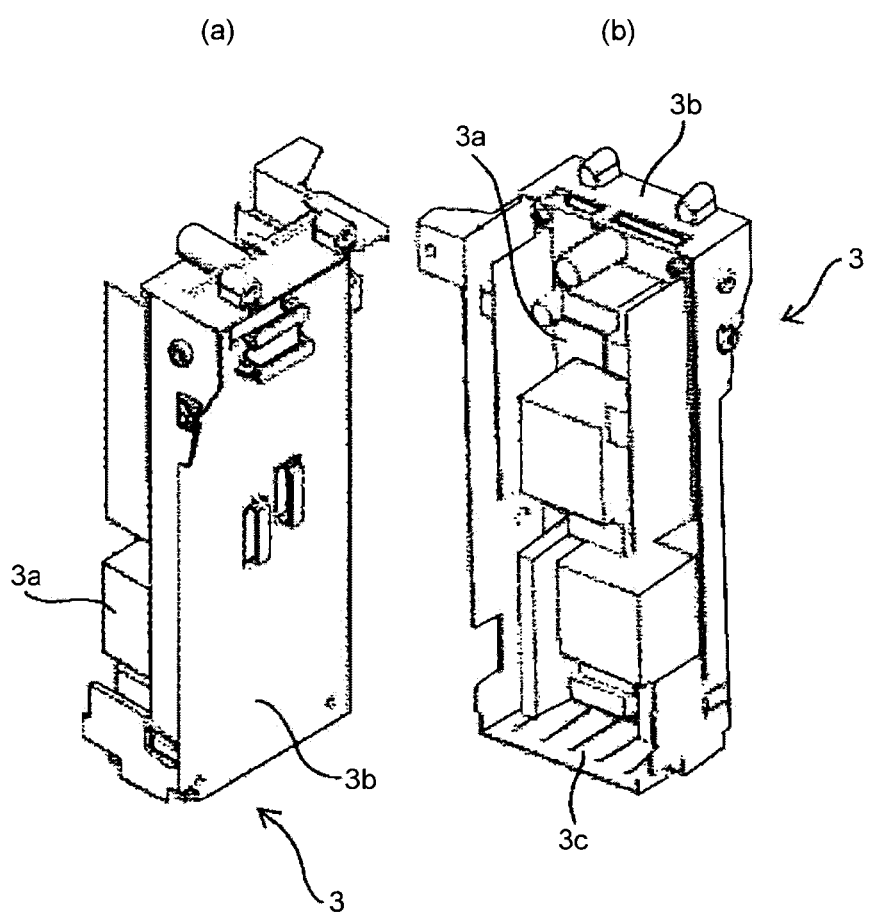
FIG. 30 is a perspective view illustrating a ballast board unit.

FIG. 30 is a perspective view illustrating the ballast board unit 3.

As illustrated in FIG. 30, the ballast board unit 3 includes a ballast board holder 3b for holding the ballast board 3a. On the bottom surface of the ballast board holder 3b, a ventilation hole 3c is provided.

Figure 31:
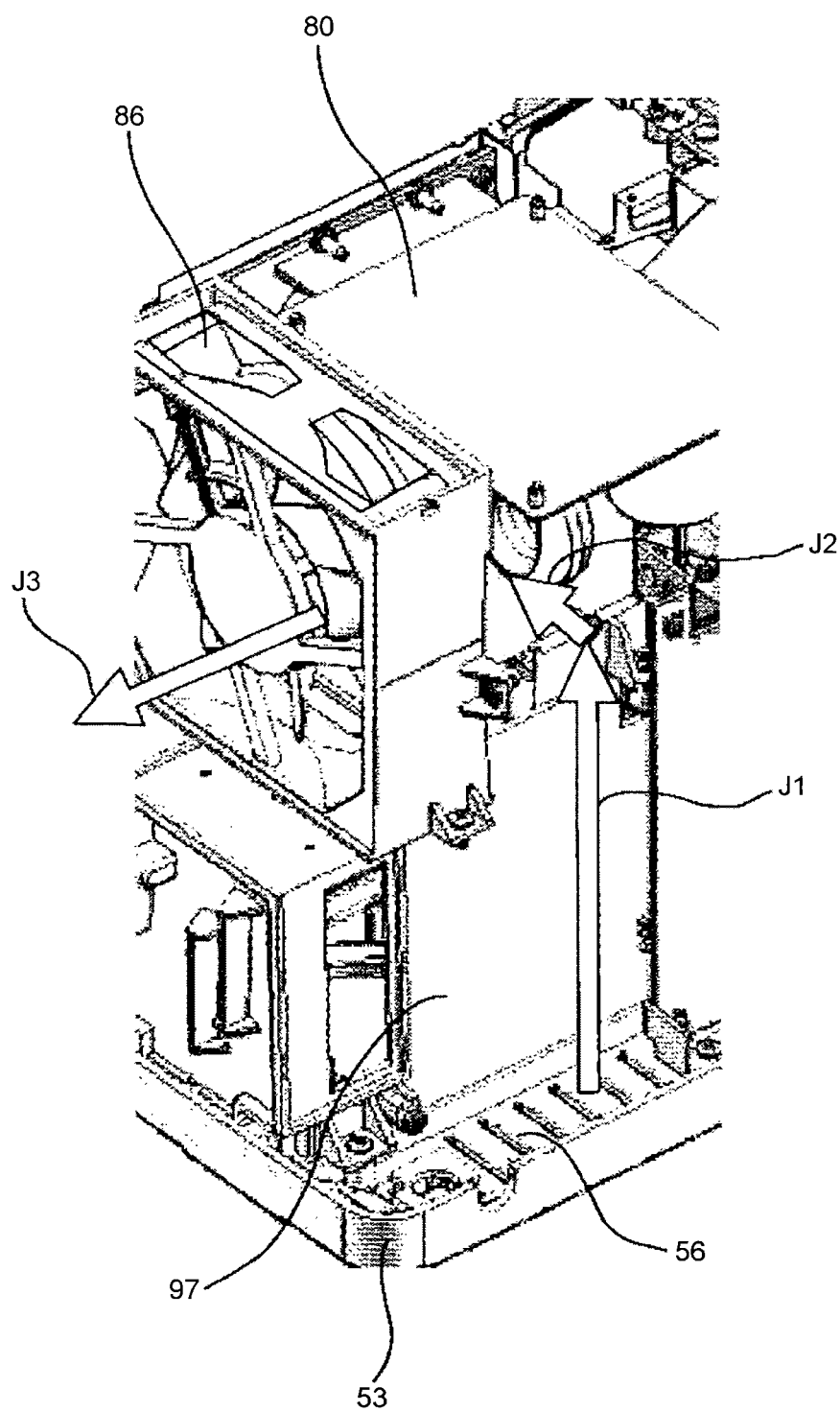
FIG. 31 is a perspective view of the apparatus main unit with the ballast board unit removed.

FIG. 31 is a perspective view of the apparatus main unit with the ballast board unit 3 removed.

As illustrated in FIG. 31, the power supply air inlet 56 is provided directly below where the ballast board unit 3 is mounted on the base member 53. The ballast board unit 3 is mounted on the apparatus main unit so that the ventilation hole 3c of the ballast board holder faces the power supply air inlet 56, and the ballast board 3a faces the light source housing 97.

The air suctioned by the discharge fan 86 through the power supply air inlet 56 flows upwardly between the light source housing 97 and the ballast board 3a, as indicated by the arrow J1 in FIG. 31. In this manner, the light source housing 97 and the ballast board 3a can be cooled. The air then flows into the space surrounded by the main PFC power board 80a, the covering surface 81b, and the sub-PFC power board 80b, as indicated by the arrow J2, to cool the PFC power boards 80a, 80b, and is finally discharged from the apparatus by the discharge fan 86, as indicated by the arrow J3.

In the manner described above, in the embodiment, the air having cooled the ballast board 3a is allowed to flow into the space surrounded by the main PFC power board 80a, the covering surface 81b, and the sub-PFC power board 80b, and allowed to cool the PFC power boards 80a, 80b as well. Therefore, the ballast board 3a and the PFC power boards 80a, 80b can be cooled efficiently.

Figure 32:
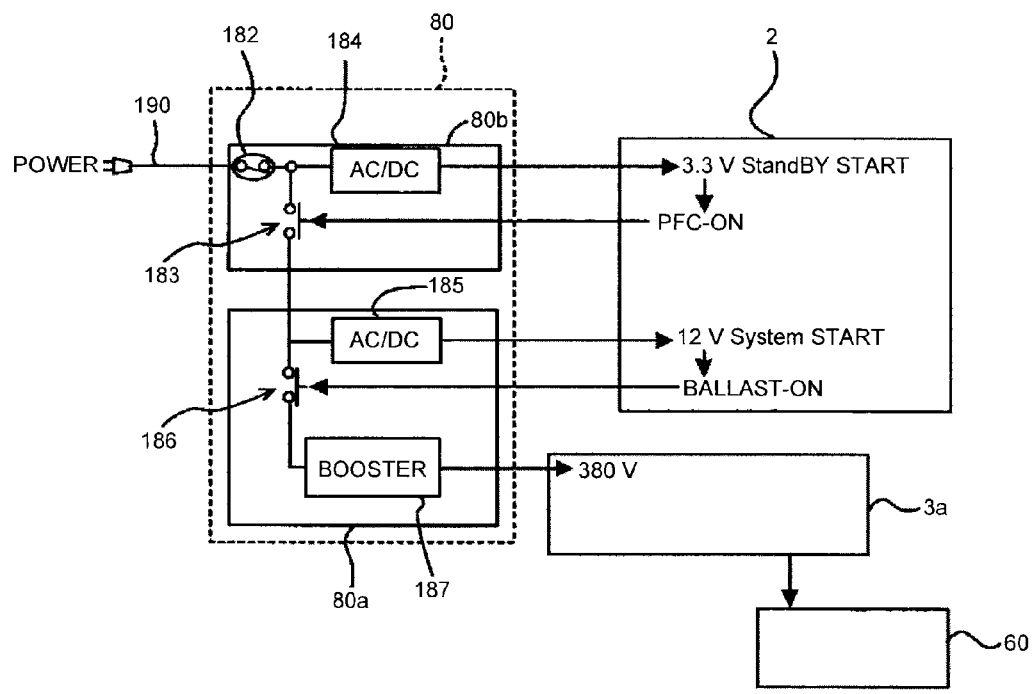
FIG. 32 is a block diagram of a power supply.

FIG. 32 is a block diagram of a power supply. As illustrated in FIG. 32, the sub-PFC power board 80b includes a PFC switch 183, and a starting voltage converter 184 for converting an alternating current voltage supplied by a power cable 190 into a direct current voltage and supplying a 3.3 volt direct current voltage to the control board 2.

The main PFC power board 80a includes a control voltage converter 185 for converting the alternating current voltage supplied by the power cable 190 into a direct current voltage and supplying a 12 volt direct current voltage to the control board 2, a ballast switch 186, and a booster 187 for boosting a 100 volt alternating current voltage to 380 volts. In the embodiment, the power unit 80 includes a plurality of boards as illustrated in FIG. 32, but the same effect can be achieved by dividing a ballast board into a plurality of boards.

When the plug of the power cable 190 is inserted into an outlet, causing an alternating current voltage to be applied to the sub-PFC power board 80b, a 3.3 volt direct current voltage is applied from the starting voltage converter 184 to the control board 2. The control board 2 applied with the 3.3 volt direct current voltage determines if the apparatus is in a normal condition by checking the temperature detected by a temperature detector such as a thermistor provided at given position of the apparatus, for example. If the apparatus is in a normal condition, the control board 2 turns on the PFC switch 183 on the sub-PFC power board 80b.

When the PFC switch 183 is turned on, the alternating current voltage from the power cable 190 is supplied to the main PFC power board 80a. Once the alternating current voltage is supplied to the main PFC power board 80a, the 12 direct current voltage is applied from the control voltage converter 185 to the control board 2. The control board 2 applied with the 12 volt direct current voltage determines if there is any abnormality in the light source 61 and the like by checking the temperature of the light source 61, for example. If no abnormality is found, the control board 2 turns on the ballast switch 186 on the main PFC power board 80a.

Once the ballast switch 186 in the main PFC power board 80a is turned on, the alternating current voltage from the power cable 190 is applied to the booster 187. The booster 187 boosts the alternating current voltage to 380 volts, and applies the 380 volt voltage to the light source 61 while causing the ballast board 3a to control to supply a stable power (current) to the light source 61. In this manner, the light source is turned on.

Figure 33:
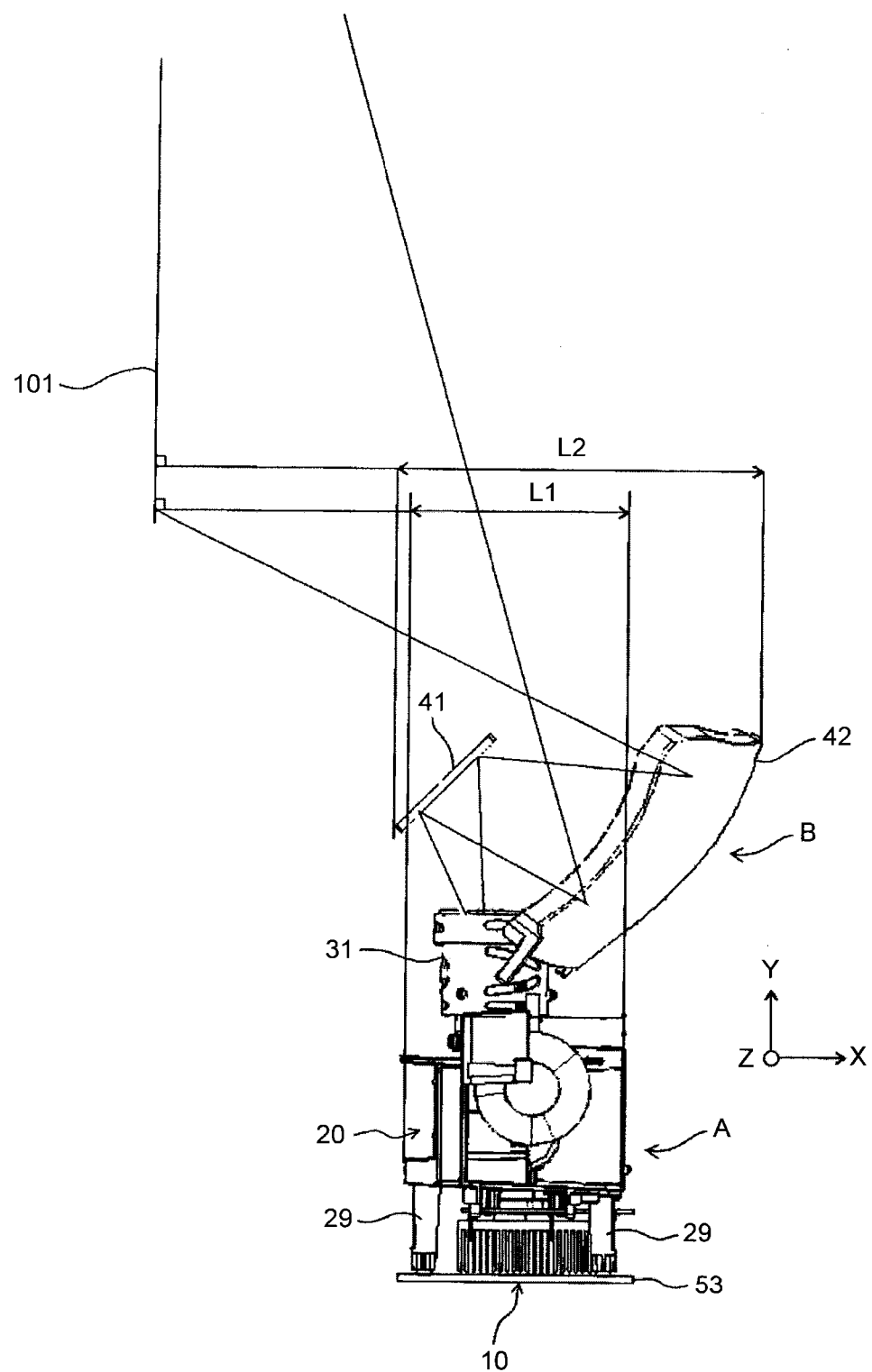
FIG. 33 is a schematic of a relation of sizes of the image forming unit and the projecting optical unit in the direction perpendicular to the projection surface.

FIG. 33 is a schematic of a relation of sizes of the image forming unit A and the projecting optical system B in the direction perpendicular to the projection surface 101.

As illustrated in FIG. 33, a maximum length L2 of the projecting optical system B in the direction perpendicular to the projection surface 101 is larger than a maximum length L1 of the image forming unit A in the direction perpendicular to the projection surface 101.

FIG. 34 is a schematic illustrating a relation of sizes of a part of the outer cover 59 facing the projecting optical system B and a part of the outer cover 59 facing the image forming unit A, in the direction perpendicular to the projection surface 101.

As illustrated in FIG. 34, in the outer cover 59 making up the outer housing, a maximum length L4 of the part facing the projecting optical system B in the direction perpendicular to the projection surface 101 is longer than a maximum length L3 facing the image forming unit A located at the bottom in FIG. 34 in the direction perpendicular to the projection surface 101, because the projecting optical system B and the image forming unit A are housed in the outer cover 59. In other words, the width of the part of the outer cover 59 facing the image forming unit A is larger than the width of the part of the outer cover 59 where the projecting optical system B is housed. To explain more specifically, the part of the outer cover 59 facing the curved mirror 42 in the projecting optical system B is longer than the part of the outer cover 59 facing the image forming unit A in the direction opposite to the projection surface 101. The outer housing includes the outer cover 59, the base member 56, and the top surface of the apparatus.

In such a structure, when a user carries the projector 1 holding the lower part of the outer cover 59 (the part facing the image forming unit A), provided above the fingers is a surface 591 moving away from the projection surface 101 in a direction moving upwardly between the part of the outer cover 59 facing the image forming unit A on the opposite side of the projection surface 101 and the part facing the curved mirror 42 in the projecting optical system B. Therefore, even if the holding force weakens while a user is carrying the projector by holding the lower part of the outer cover 59 (the part facing the image forming unit A), the surface 591 is hooked to the fingers, so that the projector 1 is prevented from slipping away from the hand and falling. In this manner, the projector 1 can be prevented from being damaged by being dropped on a floor or an installation surface.

In the embodiment, the part of the outer cover 59 facing the projecting optical system B on the opposite side of the projection surface 101 (the part facing the curved mirror 42) is longer than the part of the outer cover 59 facing the image forming unit A in a direction moving away from the projection surface 101. However, the present invention is not limited thereto. For example, the surface of the part of the outer cover 59 facing the projecting optical system B on the side of the projection surface 101 and the surface of the part of the outer cover 59 facing the projecting optical system B on the opposite side of the projection surface 101 may be configured to protrude from the part of the outer cover 59 facing the image forming unit A. By providing such a structure, even if the holding force weakens while carrying the projector, the part of the surface on the side of the projection surface 101 and the part of the surface on the side opposite to the projection surface 101 become hooked to the fingers, so that the projector 1 can be better prevented from slipping away from the hand and falling.

Explained above is merely an example, and achieved are the effects unique to the modes (1) to (4) described below.

(1)

In an image forming apparatus including the image forming unit A that forms an image using light from the light source, the projecting optical system B that forms a projected image of the image formed in the image forming unit A, and the outer housing such as the outer cover 59 for housing the image forming unit A and the projecting optical system B, the image forming unit A and the projecting optical system B are arranged in the given order from a setting surface of the outer housing such as the base member 56, and the width of the projecting optical system B in a direction perpendicular to the projection surface 101 is made larger than the width of the image forming unit A in a direction perpendicular to the projection surface 101.

Such a structure allows a part of the outer cover 59 to become hooked to the hands holding the projector 1 and suppresses the projector 1 from slipping away from the hand and falling, even when the force holding the projector 1 weakens while carrying the projector 1. In this manner, the projector 1 can be suppressed from getting damaged. Furthermore, compared with an apparatus having a knob or a handle to suppress the apparatus from falling while being carried, the number of parts is not increased. Therefore, a cost increase of the apparatus can be suppressed. Furthermore, a space for arranging the knob or the handle does no longer need to be kept. Therefore, the size of the apparatus can be reduced.

(2)

In the image projection apparatus having the configuration described in (1) above, the width of the outer housing where the projecting optical system B is provided is made larger than the width where the image forming unit A is provided in a direction opposite to the projection surface.

Such a configuration enables the installation footprint to be reduced.

(3)

Furthermore, in the image projection apparatus having the configuration described in (1) and (2) above, the projecting optical system B includes a reflecting surface; and a channel for allowing the air to pass through is provided inside of the outer housing, between the rear surface of the reflecting surface and the outer housing.

Such a configuration enables a channel for allowing the air to flow through a compact image projection apparatus.

(4)

Furthermore, in the image projection apparatus having the configuration described in (3) above, the reflecting surface is a mirror surface such as a concave mirror, e.g., the curved mirror 42, and the rear surface of the concave mirror is a convex surface following the concave surface of the mirror surface. In this manner, the air can be allowed to flow along the rear surface of the concave mirror, without reducing the momentum of the air collected into the image projection apparatus.

According to the embodiment, because the width of the outer housing in the direction perpendicular to the projection surface is larger at a position where the image forming unit is provided than at a position where the projecting optical unit is provided. Therefore, when the image projection apparatus is carried, a user can hold the lower part of the apparatus where the projecting optical unit is provided, so that the larger-width part of the outer housing becomes provided above the fingers of the hand holding the apparatus. Therefore, if the force holding the image projection apparatus weakens and the image projection apparatus slips away from the hand while the image projection apparatus is being carried, the larger-width part of the outer housing located above the fingers holding the apparatus become hooked to the top finger of the holding hand. In this manner, the image projection apparatus can be suppressed from slipping away from the hand and falling while the image projection apparatus is being carried. Therefore, the image projection apparatus can be suppressed from getting damaged. Furthermore, the number of parts can be reduced compared with an image projection apparatus provided with a handle, such as the image projection apparatus disclosed in Japanese Patent Application Laid-open No. 2011-018061, so that the cost of the apparatus is reduced. Furthermore, because it is not necessary to keep a space for providing a handle, the apparatus can be suppressed from increasing in size.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image projection apparatus comprising:
   an image forming unit that forms an image using light from a light source;
   a projecting optical unit that forms a projected image of the image formed by the image forming unit; and an outer housing that houses the image forming unit and the projecting optical unit, wherein the image forming unit and the projecting optical unit are arranged in an order from a setting surface of the outer housing along a direction parallel to a projection surface, a width of the outer housing in a direction perpendicular to the projection surface is larger at a position corresponding to a location along the direction parallel to the projection surface of the projecting optical unit than at a position corresponding to a location along the direction parallel to the projection surface of the image forming unit, the outer housing including a curved surface connecting a first flat surface and a second flat surface of the outer housing, the curved surface being concave at an exterior of the housing.

2. The image projection apparatus according to claim 1, wherein the width of the outer housing in a direction opposite to the projection surface is larger at the position corresponding to the location of the projecting optical unit than at the position corresponding to the location of the image forming unit.

3. The image projection apparatus according to claim 1, wherein the projecting optical unit includes a reflecting surface, and a channel for allowing air to flow therethrough is provided inside of the outer housing between a rear surface of the reflecting surface and the outer housing.

4. The image projection apparatus according to claim 3, wherein the reflecting surface is a mirror surface of a concave mirror, and a rear surface of the concave mirror is a convex.

5. The image projection apparatus according to claim 1, wherein:

the first flat surface and the second flat surface are parallel to each other.

6. The image projection apparatus according to claim 1, wherein:

the first flat surface corresponds to a position of the projection optical unit; and the second flat surface corresponds to a position of the image forming unit.

* * * * *